(12) United States Patent
Shin et al.

(10) Patent No.: US 10,785,283 B2
(45) Date of Patent: Sep. 22, 2020

(54) APPARATUS AND METHOD FOR TRANSMITTING AND RECEIVING FILES IN A WIRELESS COMMUNICATION SYSTEM SUPPORTING CLOUD STORAGE SERVICE

(71) Applicant: Samsung Electronics Co., Ltd., Suwon-si, Gyeonggi-do (KR)

(72) Inventors: Bong-Jhin Shin, Suwon-si (KR);
Sang-Jun Moon, Yongin-si (KR);
Yong-Seok Park, Seoul (KR);
Sang-Gon Lee, Suwon-si (KR);
Hyeon-Hun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 15/399,119

(22) Filed: Jan. 5, 2017

(65) Prior Publication Data

US 2017/0195401 A1 Jul. 6, 2017

(30) Foreign Application Priority Data

Jan. 5, 2016 (KR) .......................... 10-2016-0001054

(51) Int. Cl.
*H04L 29/08* (2006.01)
*H04W 4/70* (2018.01)

(52) U.S. Cl.
CPC .............. *H04L 67/06* (2013.01); *H04L 67/02* (2013.01); *H04L 67/1095* (2013.01); *H04L 67/1097* (2013.01); *H04W 4/70* (2018.02)

(58) Field of Classification Search
None
See application file for complete search history.

(56) References Cited

U.S. PATENT DOCUMENTS

| 9,432,454 B2 * | 8/2016 | Chakraborty | ....... H04L 67/1091 |
| 9,813,353 B1 * | 11/2017 | Suit | ......................... H04L 47/70 |
| 10,025,673 B1 * | 7/2018 | Maccanti | ............ G06F 11/1458 |

(Continued)

FOREIGN PATENT DOCUMENTS

| KR | 10-2014-0111687 A | 9/2014 |
| WO | 2014/153531 A2 | 9/2014 |
| WO | 2015/175411 A1 | 11/2015 |

OTHER PUBLICATIONS

European Office Action dated Dec. 16, 2019, issued in European Patent Application No. 17736118.5.

*Primary Examiner* — James A Edwards
(74) *Attorney, Agent, or Firm* — Jefferson IP Law, LLP

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method includes acquiring a shared address for at least one file stored at a cloud storage server upon detecting that the at least one file needs to be backed up, determining at least one other cloud storage server to which the at least one file will be backed up, and transmitting a backup request message including the shared address to the at least one other cloud storage server.

11 Claims, 21 Drawing Sheets

(56) References Cited

U.S. PATENT DOCUMENTS

| | | | |
|---|---|---|---|
| 2010/0332818 A1* | 12/2010 | Prahlad | H04L 67/1097 |
| | | | 713/150 |
| 2011/0055161 A1* | 3/2011 | Wolfe | G06F 16/245 |
| | | | 707/652 |
| 2012/0159595 A1 | 6/2012 | Barham | |
| 2012/0246191 A1* | 9/2012 | Xiong | G06Q 50/01 |
| | | | 707/769 |
| 2012/0330888 A1* | 12/2012 | Cruz | G06F 1/26 |
| | | | 707/610 |
| 2013/0054634 A1 | 2/2013 | Chakraborty et al. | |
| 2013/0198564 A1* | 8/2013 | Hasit | G06F 17/30079 |
| | | | 714/16 |
| 2013/0254314 A1 | 9/2013 | Chow | |
| 2014/0006350 A1* | 1/2014 | Fukui | G06F 17/30377 |
| | | | 707/632 |
| 2014/0006465 A1* | 1/2014 | Davis | G06F 16/182 |
| | | | 707/827 |
| 2015/0012495 A1* | 1/2015 | Prahlad | G06F 16/1844 |
| | | | 707/640 |
| 2015/0149410 A1 | 5/2015 | Haon et al. | |
| 2015/0263894 A1 | 9/2015 | Kasturi et al. | |
| 2015/0347548 A1* | 12/2015 | Mortensen | G06F 16/178 |
| | | | 707/618 |

* cited by examiner

APPARATUS AND METHOD FOR TRANSMITTING AND RECEIVING FILES IN A WIRELESS COMMUNICATION SYSTEM SUPPORTING CLOUD STORAGE SERVICE

CROSS-REFERENCE TO RELATED APPLICATION(S)

This application claims the benefit under 35 U.S.C. § 119(a) of a Korean patent application filed on Jan. 5, 2016 in the Korean Intellectual Property Office and assigned Serial number 10-2016-0001054, the entire disclosure of which is hereby incorporated by reference.

TECHNICAL FIELD

The present disclosure relates to an apparatus and method for transmitting and receiving a file in a wireless communication system supporting a cloud storage service. More particularly, the present disclosure relates to an apparatus and method for directly transmitting and receiving a file between cloud storage servers in a wireless communication system supporting a cloud storage service.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

A cloud storage service is a service in which a user device may have a storage of the user device at an internet. In the cloud storage service, the user device may access a cloud storage server in an environment in which an internet is possible to download a file of the user device which is stored at the cloud storage server, to upload the file of the user device to the cloud storage server, or to use a file stored at the cloud storage server (for example, streaming, edition, or/and the like).

Recently, various cloud storage services have been proposed, and typical examples are Dropbox™, One Drive™, Google Photos™, Amazon Photos™, N Drive™, and the like.

Recently, various cloud storage services have been activated. Specially, a major service provider such as Google Photos™, Amazon Photos™, and the like provides aggressively a cloud storage service. For example, Google Photos™ provides an unlimited storage for storing pictures, and Amazon Photos™ provides unlimited storage for storing pictures to prime members.

Meanwhile, technical barriers to a cloud storage service become low, so many start-up companies which provide a cloud storage service have been founded. Specially, Amazon web services (AWS)™ provided by Amazon™ provides an infra and a framework for which implementation and an operation may be relatively easy. Specially, in a case that AWS™ is used, users which have less experience for implementing and operating a server may be relatively easy to implement and operate a server. So, many start-up companies have provided various services which use a cloud storage service.

Further, main use cases in a cloud storage server are file upload and file download. Specially, a user generally uploads a file such as a picture, a video, and the like from a user device such as a personal computer (PC), a smart phone, a tablet, and the like to a cloud storage server, or downloads the file from the cloud storage server to the user device.

Recently, various cloud storage services are provided, so new use cases occur in a cloud storage service, and a typical one is to transmit and receive a file between cloud storage servers. For example, a case that a file needs to be transmitted from the first cloud storage service, e.g., Dropbox™ to the second cloud storage service, e.g., Google Photos' occurs. This file transmission generally occurs in a case that a user device changes a cloud storage service, that is, the user device changes a cloud storage service from a cloud storage service which has been already used to a new cloud storage service.

Since free storage capabilities provided by cloud storage services are different, and free storage capabilities provided by cloud storage services which have been recently started are greater than free storage capabilities provided by cloud storage services which have been provided already, users intend to change a cloud storage service from a cloud storage service which has been provided already to a new cloud storage service.

Further, most of cloud storage services provided by from start-up companies may be suddenly terminated. In this case, files of a user device stored at a cloud storage server need to be backed up to other cloud storage server.

A process for transmitting a file between cloud storage servers in a general wireless communication system supporting a cloud storage service will be described with reference to FIG. 1.

FIG. 1 schematically illustrates a process for transmitting a file between cloud storage servers in a general wireless communication system supporting a cloud storage service according to the related art.

Referring to FIG. 1, the wireless communication system includes a plurality of cloud storage servers, e.g., two cloud storage servers, e.g., a cloud storage server A 110 and a cloud storage server B 120.

If a file is transmitted and received between the cloud storage server A 110 and the cloud storage server B 120, for example, if a file needs to be transmitted from the cloud storage server A 110 to the cloud storage server B 120, a file stored at the cloud storage server A 110 is transmitted to the cloud storage server B 120 through a user device 130. This will be described below.

Upon detecting a need for backing up a file from the cloud storage server A 110 to the cloud storage server B 120, the user device 130 downloads the file from the cloud storage server A 110 at operation 140. After downloading the file from the cloud storage server A 110, the user device 130 uploads the file downloaded from the cloud storage server A 110 to the cloud storage server B 120 at operation 150.

As described above, in a cloud storage service which has been proposed up to now, massive amount of user device resources are consumed for file transmission and reception between cloud storage servers. Specially, in a cloud storage service, there are many cases that all files stored at a cloud storage server are backed up to other cloud storage server. In this case, a capacity of files to be backed up is very large.

Further, for file transmission and reception between cloud storage servers, two processes, i.e., a file download process from a specific cloud storage server to a user device and a file upload process from the user device to other cloud storage server need to be performed, so massive amount of network resources may be consumed.

Further, power and a memory capacity of the user device which are consumed for performing the two processes are very large.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving a file in a wireless communication system supporting a cloud storage service.

Another aspect of the present disclosure is to provide an apparatus and method for directly transmitting and receiving a file between cloud storage servers in a wireless communication system supporting a cloud storage service.

Another aspect of the present disclosure is to provide an apparatus and method for directly transmitting and receiving a file between cloud storage servers thereby a user device may check a file transmission state in a wireless communication system supporting a cloud storage service.

Another aspect of the present disclosure is to provide an apparatus and method for directly transmitting and receiving a file between cloud storage servers thereby decreasing power consumption of a user device in a wireless communication system supporting a cloud storage service.

Another aspect of the present disclosure is to provide an apparatus and method for directly transmitting and receiving a file between cloud storage servers thereby decreasing memory capacity consumption of a user device in a wireless communication system supporting a cloud storage service.

Another aspect of the present disclosure is to provide an apparatus and method for directly transmitting and receiving a file between cloud storage servers thereby decreasing network resource consumption in a wireless communication system supporting a cloud storage service.

Another aspect of the present disclosure is to provide an apparatus and method for directly transmitting and receiving a file between cloud storage servers based on a file capacity in a wireless communication system supporting a cloud storage service.

Another aspect of the present disclosure is to provide an apparatus and method for directly transmitting and receiving a file between cloud storage servers based on an available storage capacity of a cloud storage server in a wireless communication system supporting a cloud storage service.

Another aspect of the present disclosure is to provide an apparatus and method for directly transmitting and receiving a file between cloud storage servers based on a priority of a cloud storage server in a wireless communication system supporting a cloud storage service.

Another aspect of the present disclosure is to provide an apparatus and method for directly transmitting and receiving a file between cloud storage servers based on a file type in a wireless communication system supporting a cloud storage service.

Another aspect of the present disclosure is to provide an apparatus and method for directly transmitting and receiving a file between cloud storage servers based on user preference in a wireless communication system supporting a cloud storage service.

In accordance with an aspect of the present disclosure, method of a user device in a wireless communication system supporting a cloud storage service is provided. The method comprises acquiring a shared address for at least one file which is stored at a cloud storage server upon detecting that the at least one file needs to be backed up, determining at least one other cloud storage server to which the at least one file will be backed up, and transmitting a backup request message comprising the shared address to the at least one other cloud storage server thereby the at least one other cloud storage server backs up the at least one file from the cloud storage server.

In accordance with another aspect of the present disclosure, a method of a cloud storage server in a wireless communication system supporting a cloud storage service is provided. The method comprises providing information or a shared address for at least one file which needs to be backed up to a user device, and directly transmitting the at least one file to at least one other cloud storage server to which the at least one file will be backed up.

In accordance with another aspect of the present disclosure, a method of a cloud storage server in a wireless communication system supporting a cloud storage service is provided. The method comprises acquiring a shared address of other cloud storage server to which at least one file will be backed up from a user device, and backing up the at least one file from the other cloud storage server using the shared address.

In accordance with another aspect of the present disclosure, a user device in a wireless communication system supporting a cloud storage service is provided. The user device comprises a transmitter, a receiver, and at least one processor configured to acquire a shared address for at least one file which is stored at a cloud storage server upon detecting that the at least one file needs to be backed up, determine at least one other cloud storage server to which the at least one file will be backed up, and control the transmitter to transmit a backup request message comprising the shared address to the at least one other cloud storage server thereby the at least one other cloud storage server backs up the at least one file from the cloud storage server.

In accordance with another aspect of the present disclosure, a cloud storage server in a wireless communication system supporting a cloud storage service is provided. The cloud storage server comprises at transmitter and at least one processor configured to provide information or a shared address for at least one file which needs to be backed up to a user device, and control the transmitter to directly transmit the at least one file to at least one other cloud storage server to which the at least one file will be backed up.

In accordance with another aspect of the present disclosure, a cloud storage server in a wireless communication system supporting a cloud storage service is provided. The cloud storage server comprises a transmitter, a receiver, and at least one processor configured to acquire a shared address of other cloud storage server to which at least one file will be backed up from a user device, and back up the at least one file from the other cloud storage server using the shared address.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
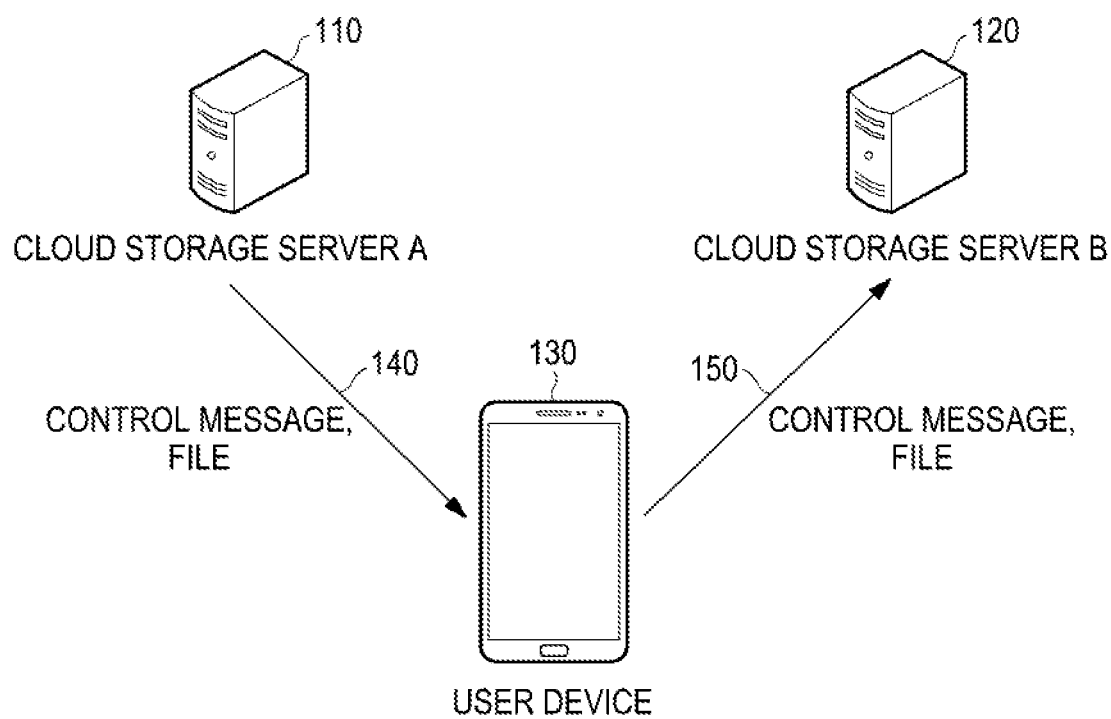
FIG. 1 schematically illustrates a process for transmitting a file between cloud storage servers in a general wireless communication system supporting a cloud storage service according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure proposes an apparatus and method for transmitting and receiving a file in a wireless communication system supporting a cloud storage service.

An embodiment of the present disclosure proposes an apparatus and method for directly transmitting and receiving a file between cloud storage servers in a wireless communication system supporting a cloud storage service.

An embodiment of the present disclosure proposes an apparatus and method for directly transmitting and receiving a file between cloud storage servers thereby a user device may check a file transmission state in a wireless communication system supporting a cloud storage service.

An embodiment of the present disclosure proposes an apparatus and method for directly transmitting and receiving a file between cloud storage servers thereby decreasing power consumption of a user device in a wireless communication system supporting a cloud storage service.

An embodiment of the present disclosure proposes an apparatus and method for directly transmitting and receiving a file between cloud storage servers thereby decreasing memory capacity consumption of a user device in a wireless communication system supporting a cloud storage service.

An embodiment of the present disclosure proposes an apparatus and method for directly transmitting and receiving a file between cloud storage servers thereby decreasing network resource consumption in a wireless communication system supporting a cloud storage service.

An embodiment of the present disclosure proposes an apparatus and method for directly transmitting and receiving a file between cloud storage servers based on a file capacity in a wireless communication system supporting a cloud storage service.

An embodiment of the present disclosure proposes an apparatus and method for directly transmitting and receiving a file between cloud storage servers based on an available storage capacity of a cloud storage server in a wireless communication system supporting a cloud storage service.

An embodiment of the present disclosure proposes an apparatus and method for directly transmitting and receiving a file between cloud storage servers based on a priority of a cloud storage server in a wireless communication system supporting a cloud storage service.

An embodiment of the present disclosure proposes an apparatus and method for directly transmitting and receiving a file between cloud storage servers based on a file type in a wireless communication system supporting a cloud storage service.

An embodiment of the present disclosure proposes an apparatus and method for directly transmitting and receiving a file between cloud storage servers based on user preference in a wireless communication system supporting a cloud storage service.

According to various embodiments of the present disclosure, for example, each of a user device and a cloud storage server may be an electronic device.

According to various embodiments of the present disclosure, a signal transmitting apparatus may be a user device, a cloud storage server, or/and the like.

According to various embodiments of the present disclosure, a signal receiving apparatus may be a user device, a cloud storage server, or/and the like.

A method and apparatus proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation project partnership 2 (3GPP2), a wideband code division multiple access (WCDMA) mobile communication system proposed in the 3GPP2, a CDMA mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced TV systems committee-mobile/handheld (ATSC-M/H) service, and the like, and an IPTV, a MPEG media transport (MMT) system and/or the like.

For convenience, the term user device may be interchangeable with the term a mobile station (MS), a user equipment (UE), a subscriber station, or/and the like.

Firstly, a process for directly transmitting and receiving a file between cloud storage servers in a wireless communication system supporting a cloud storage service according to an embodiment of the present disclosure will be described with reference to FIG. 2.

Figure 2:
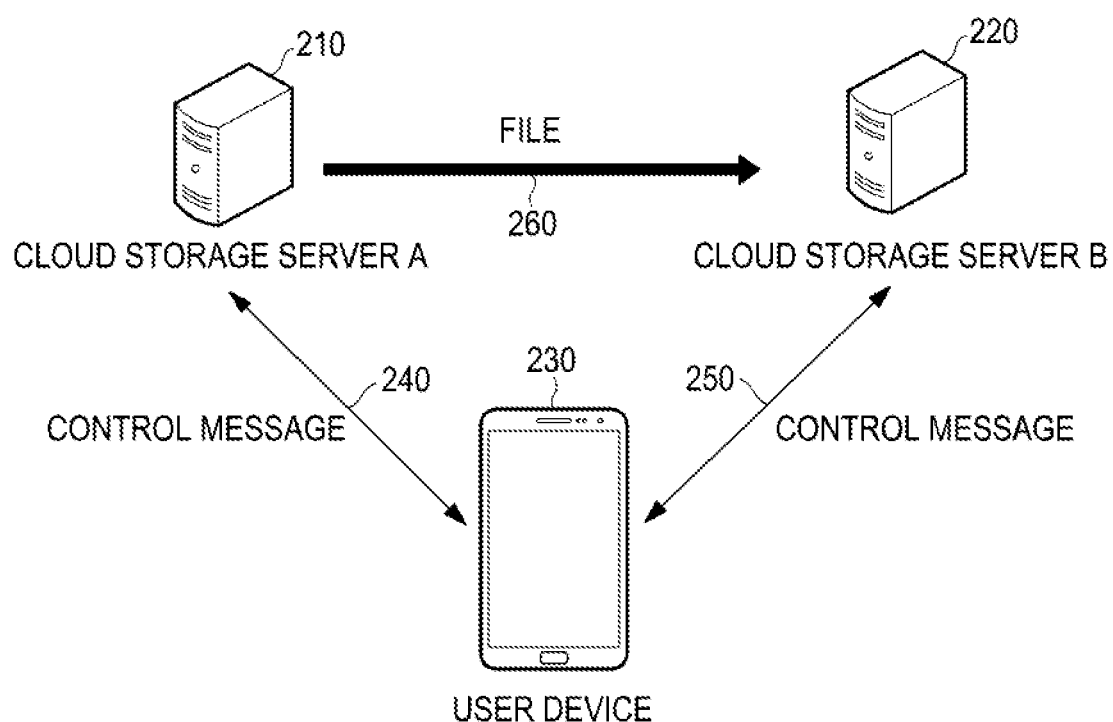
FIG. 2 schematically illustrates a process for directly transmitting and receiving a file between cloud storage servers in a wireless communication system supporting a cloud storage service according to an embodiment of the present disclosure.

FIG. 2 schematically illustrates a process for directly transmitting and receiving a file between cloud storage servers in a wireless communication system supporting a cloud storage service according to an embodiment of the present disclosure.

Referring to FIG. 2, the wireless communication system includes a plurality of cloud storage servers, e.g., two cloud storage servers, e.g., a cloud storage server A 210 and a cloud storage server B 220.

If a file is directly transmitted and received between the cloud storage server A 210 and the cloud storage server B 220, for example, if a file is transmitted from the cloud storage server A 210 to the cloud storage server B 220, a file which is stored at the cloud storage server A 210 is directly transmitted to the cloud storage server B 220 without passing the user device 230 at operation 260. The user device 230 may transmit and receive a control message which is related to file transmission and reception between the cloud storage server A 210 and the cloud storage server B 220 to and from each of the cloud storage server A 210 and the cloud storage server B 220 at operations 240 and 250. The control message which is transmitted and received between the user device 230, and the cloud storage server A 210 and the cloud storage server B 220 will be described below, and a detailed description will be omitted herein.

A process for directly transmitting and receiving a file between cloud storage servers in a wireless communication system supporting a cloud storage service according to an embodiment of the present disclosure has been described with reference to FIG. 2, and an operating process of a user device according to a process for directly transmitting and receiving a file between cloud storage servers in a wireless communication system supporting a cloud storage service according to an embodiment of the present disclosure will be described with reference to FIG. 3.

Figure 3:
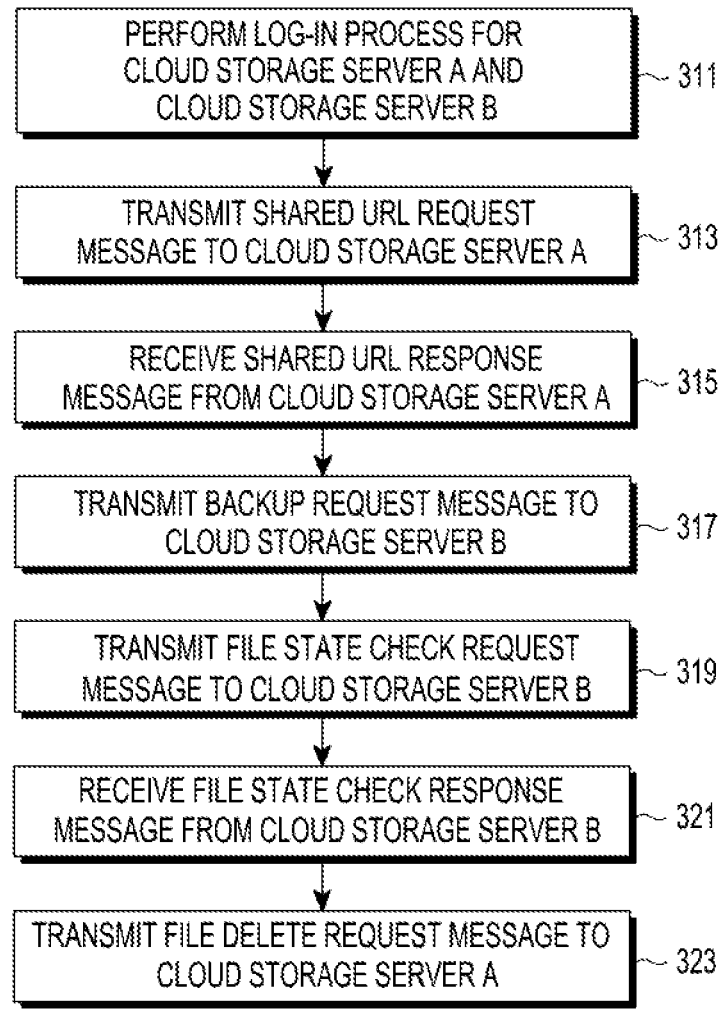
FIG. 3 schematically illustrates an operating process of a user device according to a process for directly transmitting and receiving a file between cloud storage servers in a wireless communication system supporting a cloud storage service according to an embodiment of the present disclosure.

FIG. 3 schematically illustrates an operating process of a user device according to a process for directly transmitting and receiving a file between cloud storage servers in a wireless communication system supporting a cloud storage service according to an embodiment of the present disclosure.

Referring to FIG. 3, a control message for file transmission and reception and a file need to be transmitted for the file transmission and reception. In a direct transmission scheme between cloud storage servers according to an embodiment of the present disclosure, a control message is transmitted and received through a user device, and a file is directly transmitted and received between cloud storage servers.

A user device performs a log-in process for each of cloud storage servers at operation 311. In FIG. 3, it will be assumed that the cloud storage servers for which the user device performs the log-in process are a cloud storage server A and a cloud storage server B. If the user device performs the log-in process for the cloud storage server A and the cloud storage server B already, or log-in information for the cloud storage server A and the cloud storage server B is stored in the user device already, operation 311 may be omitted.

The user device transmits a shared uniform resource locator (URL) request message for requesting a shared address, e.g., a shared URL to the cloud storage server A at operation 313. In an embodiment of the present disclosure, it will be assumed that a shared address at which cloud storage serves may share is a shared URL, and the shared address may be implemented with other forms as well as the shared URL. For convenience, for example, it will be assumed that the shared URL is allocated per file. Alternatively, the shared URL may be allocated for a plurality of files. Specially, in FIG. 3, it will be assumed that the shared URL is a shared URL for a file N. Further, a direct file transmission and reception process between the cloud storage servers are implemented thereby a user device acquires a shared URL for files stored at a specific cloud storage server to transmit the shared URL to other cloud storage server to which the user device will back up a file, that is, other cloud storage server which will download a file.

The user device receives a shared URL response message including a shared URL for the file N from the cloud storage server A at operation 315. The user device transmits a backup request message including the shared URL response message including the shared URL for the file N which is received from the cloud storage server A to the cloud storage server B at operation 317. The cloud storage server A may adjust a timing point at which the backup request message will be transmitted to the cloud storage server B. For example, the user device may adjust the timing point at which the backup request message will be transmitted to the cloud storage server B in order for the cloud storage server B to download only a specific number of files based on a speed at which the cloud storage server B downloads a file.

The user device may determine an order of files which will be directly transmitted from the cloud storage server A to the cloud storage server B. For example, the user device may determine the order of the files which will be directly transmitted from the cloud storage server A to the cloud storage server B based on a file size. For example, the user device may determine the order of the files which will be directly transmitted from the cloud storage server A to the cloud storage server B thereby the cloud storage server A may directly transmit files sequentially in order of size from a file of which a size is minimum in order.

As described above, according that the user device transmits a shared backup request message including a shared URL to the cloud storage server B, the cloud storage server B directly downloads the file N from the cloud storage server A. So, the user device transmits a file state check request message to the cloud storage server B in order to check a transmission state for the file N at operation 319. The user device receives a file state check response message as a response message to the file state check request message from the cloud storage server B at operation 321. The user device determines the file transmission state for the file N based on the file state check response message which is received from the cloud storage server B at operation 323. A file transmission state will be described below, and a detailed description will be omitted herein.

Meanwhile, the checked file transmission state is a transmission completion state indicating transmission completion, the user device detects that the cloud storage server B completed download for the file N, and transmits a file delete request message for requesting to delete the file N to the cloud storage server A. The user device needs not to request to delete the file N to the cloud storage server A, so operation 323 may be omitted.

Although FIG. 3 illustrates an operating process of a user device according to a process for directly transmitting and receiving a file between cloud storage servers in a wireless communication system supporting a cloud storage service according to an embodiment of the present disclosure, various changes could be made to FIG. 3. For example, although shown as a series of operations, various operations in FIG. 3 could overlap, occur in parallel, occur in a different order, or occur multiple times.

An operating process of a user device according to a process for directly transmitting and receiving a file between cloud storage servers in a wireless communication system supporting a cloud storage service according to an embodiment of the present disclosure has been described with reference to FIG. 3, and an example of a process for directly transmitting and receiving a file between cloud storage servers in a wireless communication system supporting a cloud storage service according to an embodiment of the present disclosure will be described with reference to FIG. 4.

Figure 4:
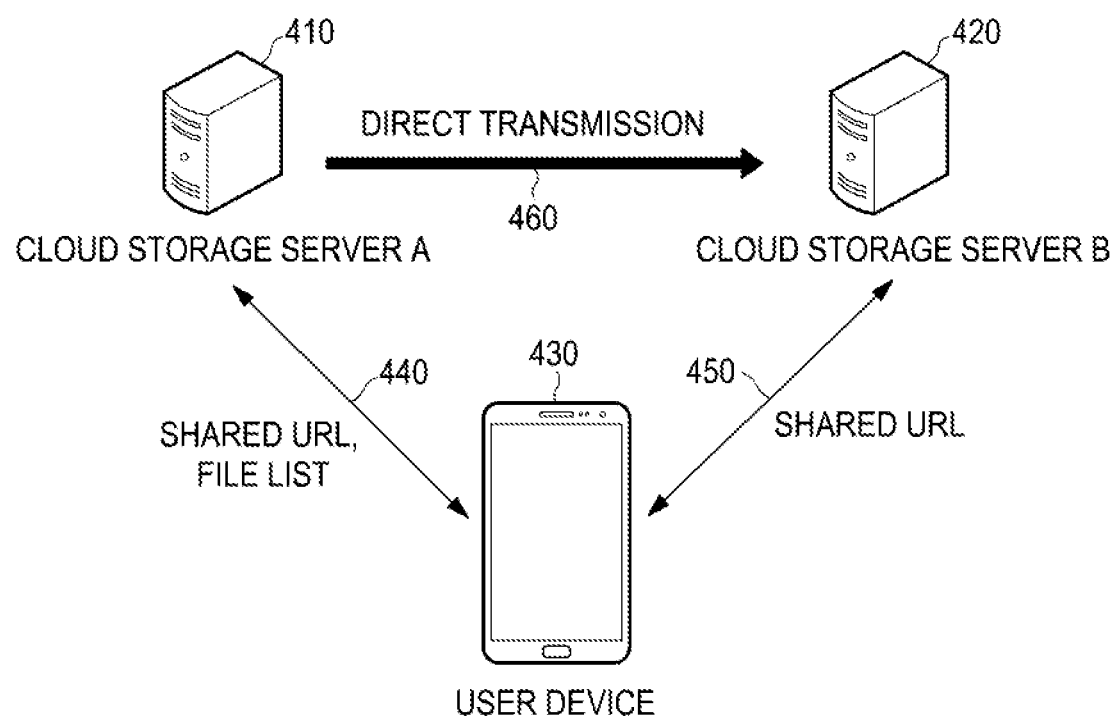
FIG. 4 schematically illustrates an example of a process for directly transmitting and receiving a file between cloud storage servers in a wireless communication system supporting a cloud storage service according to an embodiment of the present disclosure.

FIG. 4 schematically illustrates an example of a process for directly transmitting and receiving a file between cloud storage servers in a wireless communication system supporting a cloud storage service according to an embodiment of the present disclosure.

Referring to FIG. 4, the wireless communication system includes a plurality of cloud storage servers, e.g., two cloud storage servers, e.g., a cloud storage server A 410 and a cloud storage server B 420.

If files are transmitted from the cloud storage server A 410 to the cloud storage server B 420, files which are stored at the cloud storage server A 410 are directly transmitted to the cloud storage server B 420 without passing a user device 430 at operation 460. That is, if there are files which will be transmitted from the cloud storage server A 410 to the cloud storage server B 420, the user device 430 receives a shared URL for each of the files from the cloud storage server A 410 at operation 440, and transmits the shared URL for each of the files to the cloud storage server B 420 at operation 450, thereby files may be directly transmitted from the cloud storage server A 410 to the cloud storage server B 420. As described in FIG. 4, the cloud storage server A 410 generates a shared URL.

An example of a process for directly transmitting and receiving a file between cloud storage servers in a wireless communication system supporting a cloud storage service according to an embodiment of the present disclosure has been described with reference to FIG. 4, and a process for transmitting and receiving a signal according to a process for directly transmitting and receiving a file between cloud storage servers in FIG. 4 will be described with reference to FIG. 5.

Figure 5:
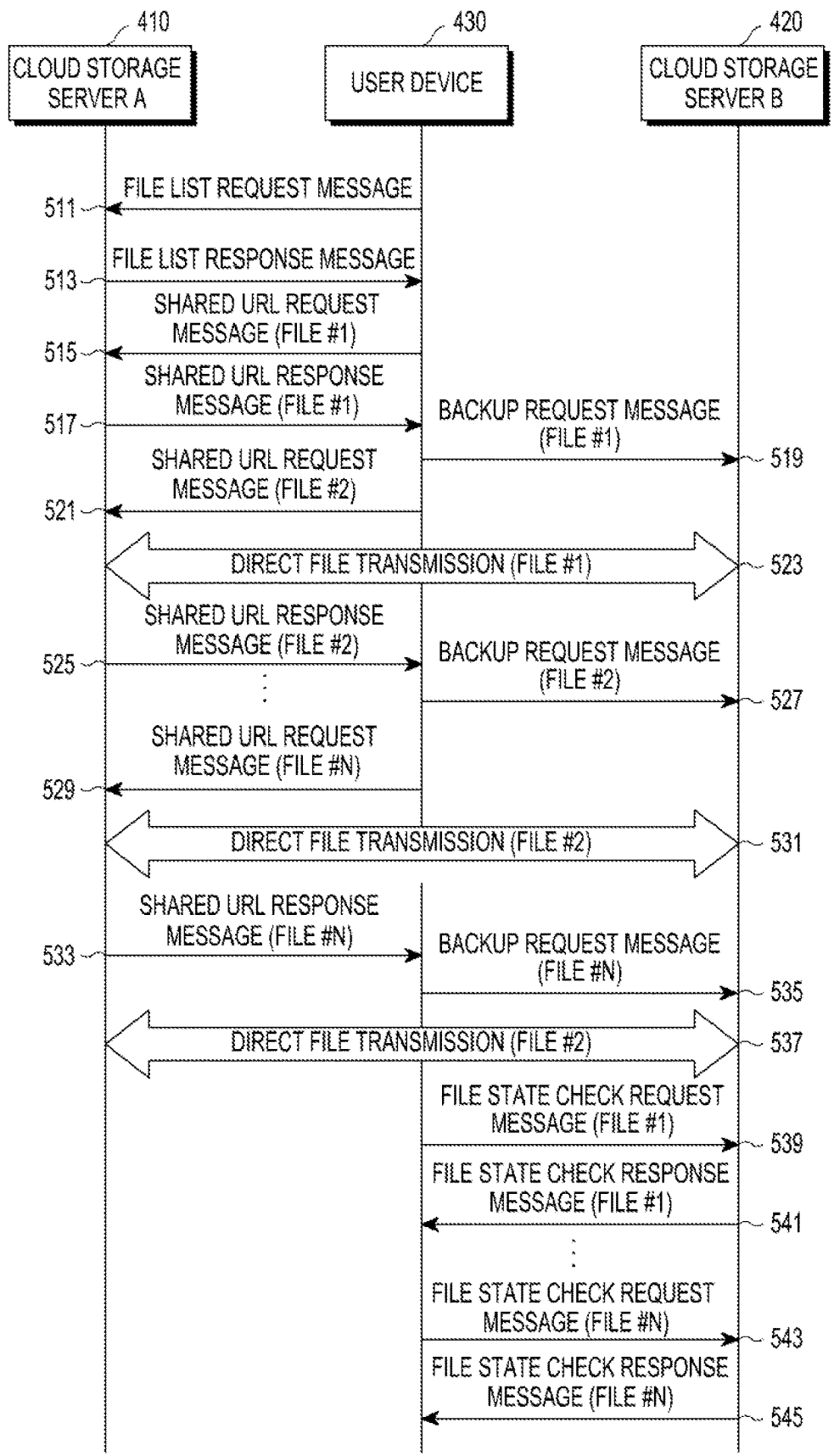
FIG. 5 schematically illustrates a process for transmitting and receiving a signal according to a process for directly transmitting and receiving a file between cloud storage servers in FIG. 4 according to an embodiment of the present disclosure.

FIG. 5 schematically illustrates a process for transmitting and receiving a signal according to a process for directly transmitting and receiving a file between cloud storage servers in FIG. 4 according to an embodiment of the present disclosure.

Referring to FIG. 5, upon detecting that files need to be transmitted from a cloud storage server A 410 to a cloud storage server B 420, a user device 430 transmits a file list request message for requesting a file list for files which will be transmitted from the cloud storage server A 410 to the cloud storage server B 420 to the cloud storage server A 410 at operation 511. Here, the number of files is N, and the file list includes a file identifier (ID) for each of the N files. Upon receiving the file list request message from the user device 430, the cloud storage server A 410 transmits a file list response message including a file list for the files which will be transmitted from the cloud storage server A 410 to the cloud storage server B 420 to the user device 430 at operation 513.

Upon receiving the file list response message from the cloud storage server A 410, the user device 430 transmits a shared URL request message for requesting a shared URL for a file #1 to the cloud storage server A 410 at operation 515. Upon receiving the shared URL request message from the user device 430, the cloud storage server A 410 generates a shared URL for the file #1, and transmits a shared URL response message including the shared URL for the file #1 to the user device 430 at operation 517. Upon receiving the shared URL response message from the cloud storage server A 410, the user device 430 transmits a backup request message including the shared URL for the file #1 to the cloud storage server B 420 at operation 519.

The user device 430 transmits a shared URL request message for requesting a shared URL for a file #2 to the cloud storage server A 410 at operation 521. The cloud storage server B 420 downloads the file #1 from the cloud storage server A 410 using the shared URL for the file #1 at operation 523.

Upon receiving the shared URL request message for the file #2 from the user device 430, the cloud storage server A 410 generates a shared URL for the file #2, and transmits a shared URL response message including the shared URL for the file #2 to the user device 430 at operation 525. Upon receiving the shared URL response message from the cloud storage server A 410, the user device 430 transmits a backup request message including the shared URL for the file #2 to the cloud storage server B 420 at operation 527.

In this way, the user device 430 transmits a shared URL request message for requesting a shared URL for a file # N as the last file to the cloud storage server A 410 at operation 529. The cloud storage server B 420 downloads a file #2 from the cloud storage server A 410 using the shared URL for the file #2 at operation 531.

Upon receiving the shared URL request message for the file # N from the user device 430, the cloud storage server A 410 generates a shared URL for the file # N, and transmits a shared URL response message including the shared ULR for the file # N to the user device 430 at operation 533. Upon receiving the shared URL response message from the cloud storage server A 410, the user device 430 transmits a backup request message including the shared URL for the file # N to the cloud storage server B 420 at operation 535. The cloud storage server B 420 downloads the file # N from the cloud storage server A 410 using the shared URL for the file # N at operation 537.

The user device 430 transmits a file state check request message for checking a transmission state for the file #1 to the cloud storage server B 420 at operation 539. Upon receiving the file state check request message from the user device 430, the cloud storage server B 420 checks a transmission state for the file #1, and transmits a file state check response message including transmission state information indicating the transmission state for the file #1 to the user device 430 at operation 541. A file transmission state will be described below, and a detailed description will be omitted herein.

In this way, the user device 430 transmits a file state check request message for checking a file transmission state for the file # N to the cloud storage server B 420 at operation 543. Upon receiving the file state check request message from the user device 430, the cloud storage server B 420 checks a transmission state for the file # N, and transmits a file state check response message including transmission state information indicating the file transmission state for the file # N to the user device 430 at operation 545.

A process for transmitting and receiving a signal according to a process for directly transmitting and receiving a file between cloud storage servers in FIG. 4 has been described with reference to FIG. 5, and another example of a process for directly transmitting and receiving a file between cloud storage servers in a wireless communication system supporting a cloud storage service according to an embodiment of the present disclosure will be described with reference to FIG. 6.

Figure 6:
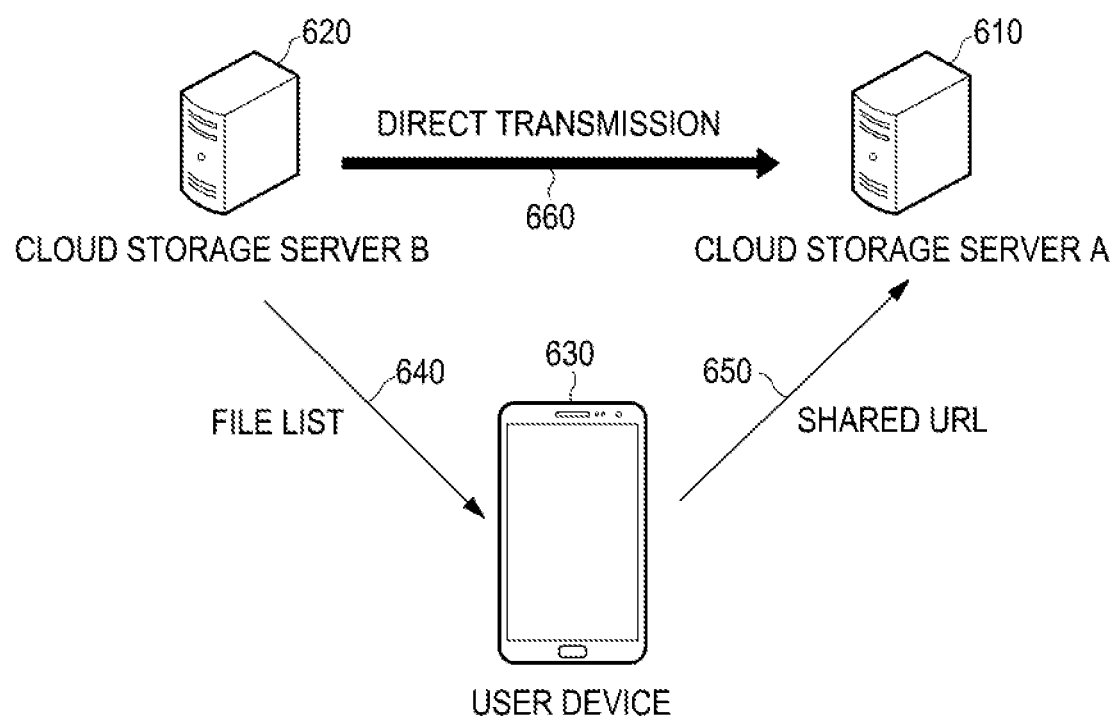
FIG. 6 schematically illustrates another example of a process for directly transmitting and receiving a file between cloud storage servers in a wireless communication system supporting a cloud storage service according to an embodiment of the present disclosure.

FIG. 6 schematically illustrates another example of a process for directly transmitting and receiving a file between cloud storage servers in a wireless communication system supporting a cloud storage service according to an embodiment of the present disclosure.

Referring to FIG. 6, the wireless communication system includes a plurality of cloud storage servers, e.g., two cloud storage servers, e.g., a cloud storage server A 610 and a cloud storage server B 620.

If files need to be transmitted from the cloud storage server B 620 to the cloud storage server A 610, files which are stored at the cloud storage server B 620 are directly transmitted to the cloud storage server A 610 without passing a user device 630 at operation 660. That is, if there are the files which need to be transmitted from the cloud storage server B 620 to the cloud storage server A 610, the user device 630 receives a file list from the cloud storage server B 620 at operation 640, and generates a shared URL for each of file IDs included in the received file list.

The user device 630 transmits the shared URL for each of the file IDs to the cloud storage server A 610 at operation 650 thereby files may be directly transmitted from the cloud storage server B 620 to the cloud storage server A 610. As described above, in FIG. 6, the user device 630, not the cloud storage server B 620 generates a shared URL.

Another example of a process for directly transmitting and receiving a file between cloud storage servers in a wireless communication system supporting a cloud storage service according to an embodiment of the present disclosure has been described with reference to FIG. 6, and a process for transmitting and receiving a signal according to a process for directly transmitting and receiving a file between cloud storage servers in FIG. 6 will be described with reference to FIG. 7.

Figure 7:
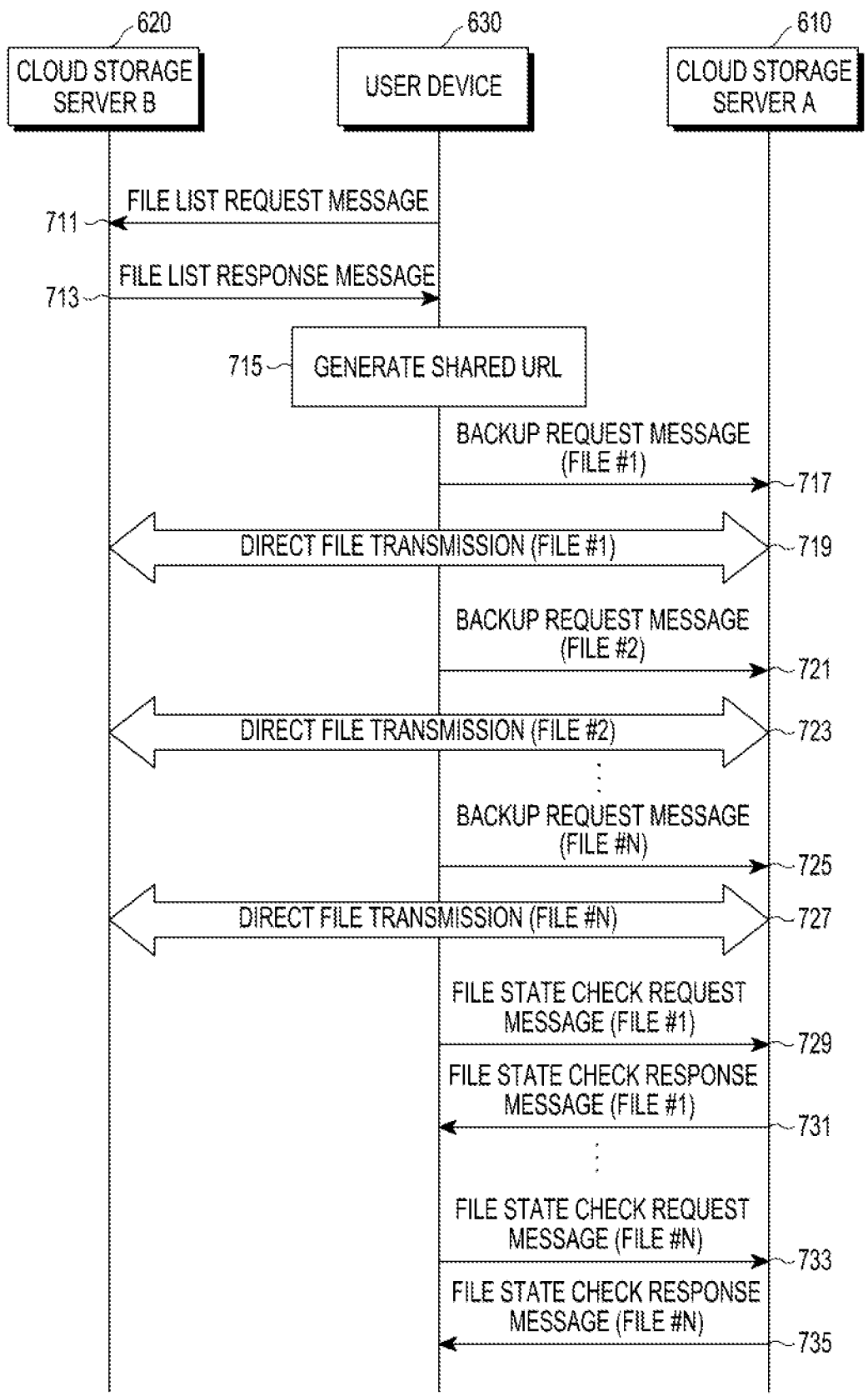
FIG. 7 schematically illustrates a process for transmitting and receiving a signal according to a process for directly transmitting and receiving a file between cloud storage servers in FIG. 6 according to an embodiment of the present disclosure.

FIG. 7 schematically illustrates a process for transmitting and receiving a signal according to a process for directly transmitting and receiving a file between cloud storage servers in FIG. 6 according to an embodiment of the present disclosure.

Referring to FIG. 7, upon detecting that files need to be transmitted from a cloud storage server B 620 to a cloud storage server A 610, a user device 630 transmits a file list request message for requesting a file list for files which will be transmitted from the cloud storage server B 620 to the cloud storage server A 610 to the cloud storage server B 620 at operation 711. Here, the number of files is N, and the file list includes a file ID for each of the N files. Upon receiving the file list request message from the user device 630, the cloud storage server B 620 transmits a file list response message including a file list for the files which will be transmitted from the cloud storage server B 620 to the cloud storage server A 610 to the user device 630 at operation 713.

Upon receiving the file list response message from the cloud storage server B 610, the user device 630 generates a shared URL for each of file IDs included in the file list at operation 715, and transmits the shared URL for each of the file IDs to the cloud storage server A 610 thereby the cloud storage server A 610 may download a related file from the cloud storage server B 620. That is, the user device 630 transmits the shared URL for each of the file #1 to the file # N to the cloud storage server A 610 using a backup request message at operations 717, 721, and 725, and the cloud storage server A 610 downloads the file #1 to the file # N from the cloud storage server B 620 using the shared URL for each of the file #1 to the file # N which is received from the user device 630 at operations 719, 723, and 727.

The user device 630 transmits a file state check request message for checking a transmission state for the file #1 to the cloud storage server A 610 at operation 729. Upon receiving the file state check request message from the user device 630, the cloud storage server A 610 checks a transmission state for the file #1, and transmits a file state check response message including transmission state information indicating the transmission state for the file #1 to the user device 630 at operation 731.

In this way, the user device 630 transmits a file state check request message for checking a transmission state for the file # N as the last file to the cloud storage server A 610 at operation 733. Upon receiving the file state check request message from the user device 630, the cloud storage server A 610 checks a transmission state for the file # N, and transmits a file state check response message including transmission state information indicating the transmission state for the file # N to the user device 630 at operation 735.

Meanwhile, if a process for directly transmitting and receiving a file between cloud storage servers is performed, there is a need for checking a transmission state for a related file in a user device. That is, even though a specific cloud storage server, e.g., a cloud storage server B downloads a file from other cloud storage server, e.g., a cloud storage server A, the cloud storage server B does not inform a transmission state for the file to a user device.

So, the user device may check a transmission state for a related file by transmitting a control message, e.g., a file state check request message to the cloud storage server B. That is, upon receiving the file state check request message, the cloud storage server B checks a transmission state for the related file, and transmits a file state response message including transmission state information indicating the checked transmission state to the user device.

A transmission state may be one of the following three states.
(1) Transmission standby state
(2) Transmission progress state
(3) Transmission completion state In a case that the process for directly transmitting and receiving the file between the cloud storage servers, the reason why a user device checks a transmission state for a related file is for checking whether the related file is successfully transmitted.

So, if transmission state information included in a file state check response message indicates a transmission standby state or a transmission progress state, a user device needs to transmit a file state check request message to the cloud storage server again, and to continuously check a transmission state for the file until a file state check response message including transmissions state information indicating a transmission completion state is received.

So, an embodiment of the present disclosure proposes a scheme for checking a transmission state thereby decreasing a retransmission count for a file state check request message, and this will be described below.

The first scheme for checking a transmission state is a scheme in which a user device predicts file transmission time between cloud storage servers and transmits a file state check request message based on the predicted file transmission time, and this will be described with reference to FIG. 8.

Figure 8:
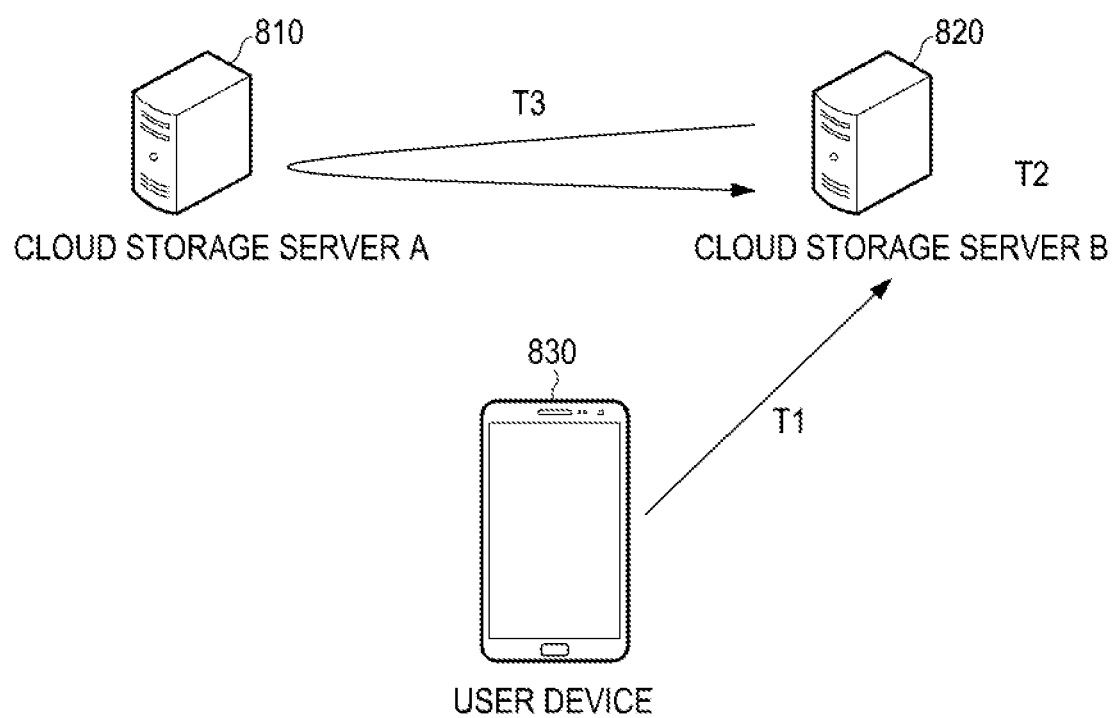
FIG. 8 schematically illustrates an example of a scheme for checking a transmission state for a file in a user device in a case that a process for directly transmitting and receiving a file between cloud storage servers is performed in a wireless communication system supporting a cloud storage service according to an embodiment of the present disclosure.

FIG. 8 schematically illustrates an example of a scheme for checking a transmission state for a file in a user device in a case that a process for directly transmitting and receiving a file between cloud storage servers is performed in a wireless communication system supporting a cloud storage service according to an embodiment of the present disclosure.

Referring to FIG. 8, if a cloud storage server A 810 directly transmits a file to a cloud storage server B 820, T2 and T3 need to be estimated in an embodiment of the present disclosure. Here, T2 denotes time during which the cloud storage server B 820 stands by transmission, and T3 denotes time which is required for the cloud storage server B 820 to receive a file from the cloud storage server A 810 and check a transmission state for the file.

Firstly, a user device 830 stores time T1 at which a backup request message for each file is transmitted to a cloud storage server B 820 for each file. The user device 830 measures time from time at which the user device 830 transmits a backup request message for a file which is firstly transmitted, e.g., a file #1 to time at which transmission for the file #1 is completed, and it will be assumed that the measured time is T3. After transmitting the backup request message for the file #1 to the cloud storage server B 820, the user device 830 periodically checks a transmission state for the file #1. A period by which the user device 830 checks a transmission state for a specific file may be determined by considering various parameters, and a detailed description will be omitted herein.

Meanwhile, the user device 830 predicts transmission completion time for the next file, e.g., a file #2, and this will be described below.

Firstly, the user device 830 assumes that T3 is equal to T3 for the file #1. The user device 830 assumes that T2 is T3×S (T2=T3×S). Here, S denotes the number of files for which transmission is stand by before the file #2 is transmitted. So, transmission prediction time for the file #2 is T3×(S+1).

So, the user device 830 transmits a file state check request message for the file #2 to the cloud storage serve B 820 after the transmission prediction time. If transmission state information included in a file state check response message which is received from the cloud storage server B 820 indicates a transmission standby state or a transmission progress state even though the user device 830 transmits the file state check request message for the file #2 after the transmission prediction time, the user device 830 updates a value of T3. Here, the user device 830 updates the value of T3 by increasing the value of T3 on a preset step value basis, or by adding difference between the transmission prediction time for the file #2 and time at which a file state check response message including file state information indicating a transmission completion state for the file #2 is received from the cloud storage server B 820 into the value of T3.

The second scheme for checking a transmission state is a scheme in which a user device checks a transmission state for some files among total files, and checks a transmission state for the remaining files based on the checked result for the some files, and this will be described with reference to FIG. 9.

Figure 9:
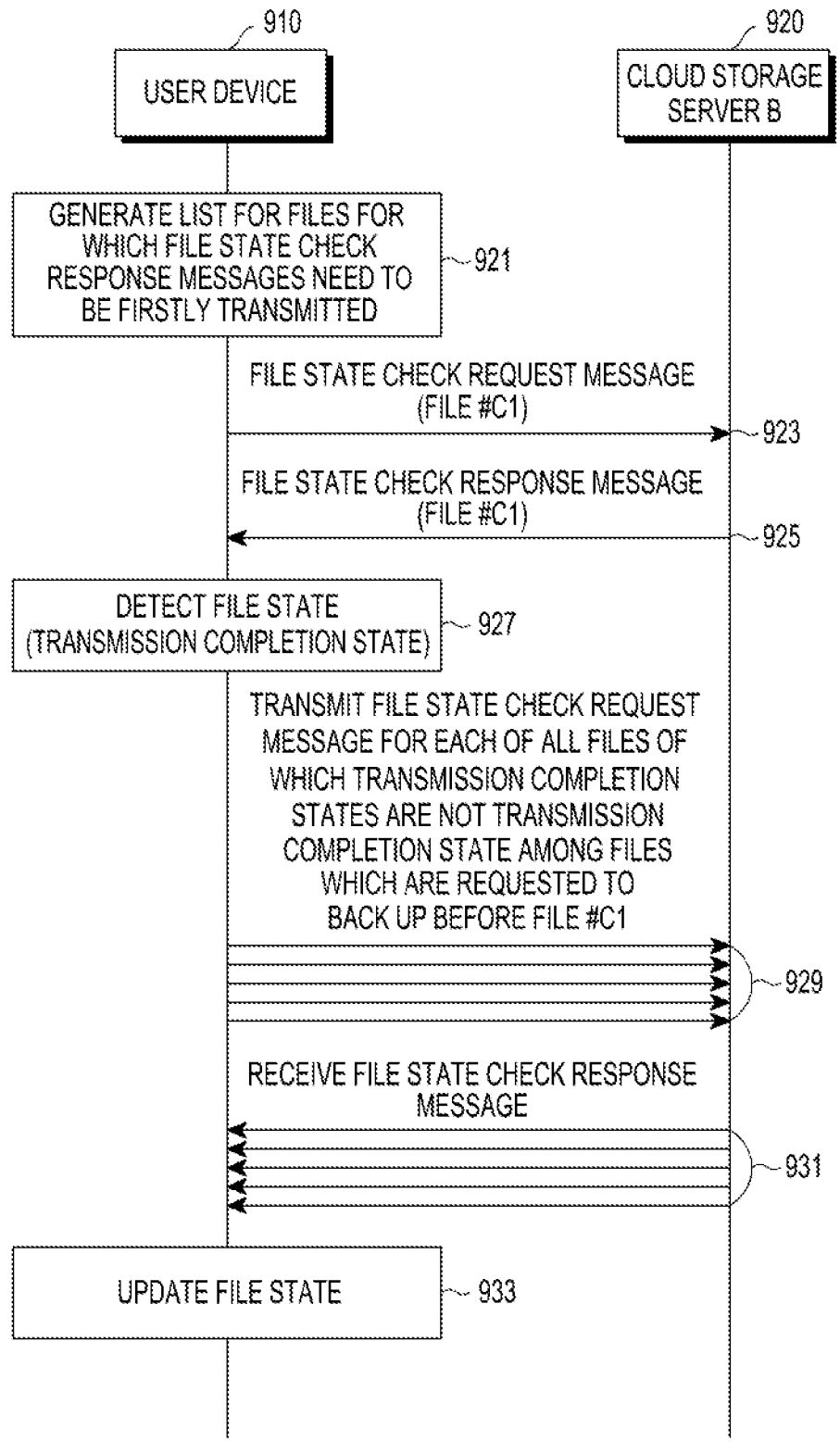
FIG. 9 schematically illustrates another example of a scheme for checking a transmission state for a file in a user device in a case that a process for directly transmitting and receiving a file between cloud storage servers is performed in a wireless communication system supporting a cloud storage service according to an embodiment of the present disclosure.

FIG. 9 schematically illustrates another example of a scheme for checking a transmission state for a file in a user device in a case that a process for directly transmitting and receiving a file between cloud storage servers is performed in a wireless communication system supporting a cloud storage service according to an embodiment of the present disclosure.

Referring to FIG. 9, a user device 910 transmits a backup request message including a shared URL for each of files which will be downloaded from a cloud storage server A (not shown in FIG. 9) to a cloud storage server B 920. In this case, the user device 910 generates a list for files for which file state check response messages need to be firstly transmitted by the cloud storage server B 920 at operation 921. The files for which the file state check response messages need to be firstly transmitted may be randomly selected, or may be selected corresponding to a specific rule or a specific algorithm. For convenience, in FIG. 9, it will be assumed that a file for which a file state check response message needs to be firstly transmitted by the cloud storage server B 920 is a file # C1.

The user device 910 transmits a file state check request message for the file # C1 to the cloud storage server B 920 at operation 923. Upon receiving the file state check request message from the user device 910, the cloud storage server B 920 checks a file state for the file # C1, and transmits a file state check response message including transmission state information indicating the checked transmission state to the user device 910 at operation 925.

After receiving the file state check response message from the cloud storage server B 920, the user device 910 determines whether the transmissions state information included in the file state check response message indicates a transmission completion state at operation 927. If the transmissions state information indicates a transmission completion state, the user device 910 transmits a file state check request message for each of all files of which transmission completion states are not the transmission completion state among files which are requested to back up before the file # C1 at operation 929.

After receiving the file state check request message for each of all files of which transmission completion states are not the transmission completion state among files which are requested to back up before the file # C1, the cloud storage server B 920 checks a transmission state for each of all files for which the file state check request messages are received. The cloud storage server B 920 transmits file state check response messages including transmission state information indicating the checked transmission states to the user device 910 at operation 931. After receiving the file state check response messages from the cloud storage server B 920, the user device 910 updates file states for related files at operation 933.

Not shown in FIG. 9, if the checked transmission state information does not indicate the transmission completion state at operation 927, that is, if the checked transmission state information indicates a transmission standby state or a transmission progress state, the user device 910 retransmits the file state check request message for the file # C1 to the cloud storage server B 920.

Meanwhile, upon downloading a plurality of files from the cloud storage server B 920, the user device 910 needs not to check transmission states for all of the plurality of files real time in order to indicate the transmission states for all of the plurality of files. That is, the user device 910 outputs only information indicating which percentage of transmission for the plurality of files has been currently completed, so the user device 910 needs not to check the transmission states for all of the plurality of files.

Generally, transmission for a file which is requested to firstly be downloaded has been firstly completed in a case that a plurality of files is downloaded. So, a user device checks transmission states for some files among the plurality of files, and checks transmission states for files which are requested to be backed up before the some files of which transmission states are transmission completion states if the transmission states for the some files are the transmission completion states. So, the user device may decrease retransmission count for a file state check request message for each of files to be downloaded.

A scheme for checking a transmission state for a file thereby decreasing a retransmission count for a file state check request message according to an embodiment of the present disclosure has been described above, and a process for directly transmitting a file to a plurality of cloud storage servers in a wireless communication system supporting a cloud storage service according to an embodiment of the present disclosure will be described with reference to FIG. 10.

Figure 10:
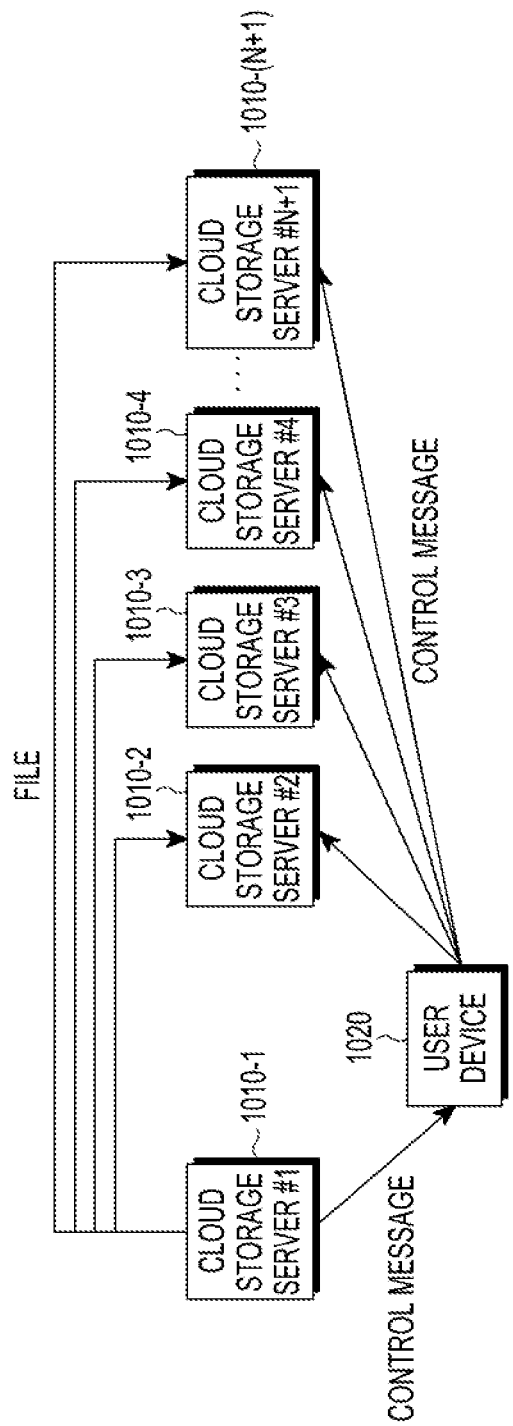
FIG. 10 schematically illustrates a process for directly transmitting a file to a plurality of cloud storage servers in a wireless communication system supporting a cloud storage service according to an embodiment of the present disclosure.

FIG. 10 schematically illustrates a process for directly transmitting a file to a plurality of cloud storage servers in a wireless communication system supporting a cloud storage service according to an embodiment of the present disclosure.

Referring to FIG. 10, the wireless communication system includes a plurality of cloud storage servers, e.g., N+1 cloud storage servers, e.g., a cloud storage server #1 1010-1, a cloud storage server #2 1010-2, a cloud storage server #3 1010-3, a cloud storage server #4 1010-4, . . . , and a cloud storage server # N+1 1010-(N+1).

Upon detecting a need for transmitting files which are stored at the cloud storage server #1 1010-1 to other cloud storage server, a user device 1020 enables a plurality of cloud storage servers, instead of just one cloud storage server, to download files which are stored at the cloud storage server #1 1010-1. That is, the user device 1020 requests a file list to the cloud storage server #1 1010-1, and may request file download to a related cloud storage server corresponding to a file list upon receiving the file list. The file list includes the number of files to be directly transmitted, a file ID of each of the files to be directly transmitted, and a size of each of the files to be directly transmitted.

For convenience, in FIG. 10, it will be assumed that the user device 1020 determines to enable all of remaining cloud storage servers included in the wireless communication system, i.e., the cloud storage server #2 1010-2, the cloud storage server #3 1010-3, the cloud storage server #4 1010-4, . . . , and the cloud storage server # N+1 1010-(N+1) to download the files which are stored at the cloud storage server #1 1010-1. A scheme for determining a plurality of cloud storage servers to which the cloud storage server #1 1010-1 will directly transmit files and a scheme for determining amount of a file which is directly transmitted to selected cloud storage servers will be described below, so a detailed description will be omitted herein.

A process for directly transmitting a file to a plurality of cloud storage servers in a wireless communication system supporting a cloud storage service according to an embodiment of the present disclosure has been described with reference to FIG. 10, and a process for transmitting and receiving a signal according to a process for directly transmitting a file to a plurality of cloud storage servers in FIG. 10 will be described with reference to FIG. 11.

Figure 11:
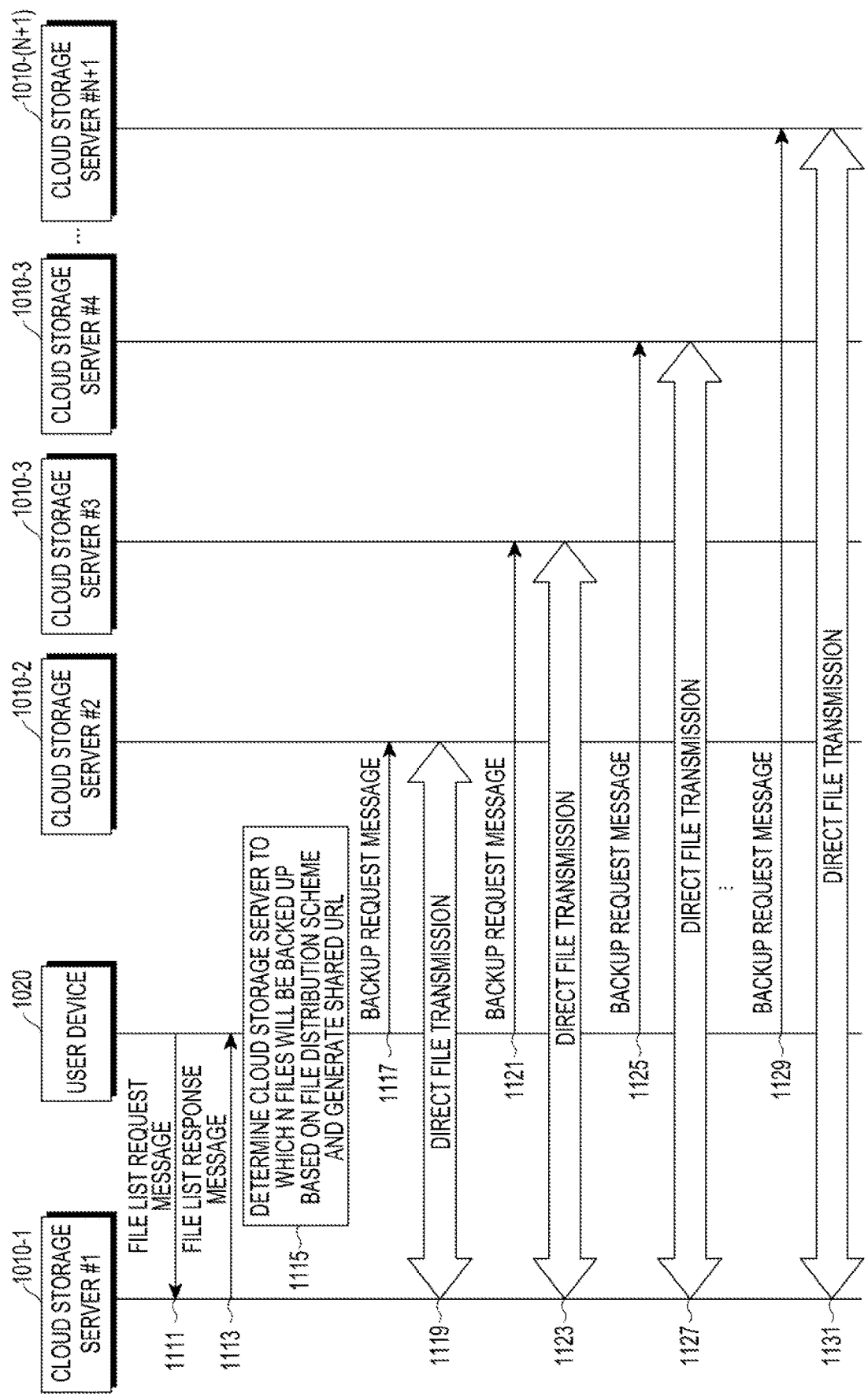
FIG. 11 schematically illustrates a process for transmitting and receiving a signal according to a process for directly transmitting a file to a plurality of cloud storage servers in FIG. 10 according to an embodiment of the present disclosure.

FIG. 11 schematically illustrates a process for transmitting and receiving a signal according to a process for directly transmitting a file to a plurality of cloud storage servers in FIG. 10 according to an embodiment of the present disclosure.

Referring to FIG. 11, the wireless communication system includes a plurality of cloud storage servers, e.g., N+1 cloud storage servers, e.g., a cloud storage server #1 1010-1, a cloud storage server #2 1010-2, a cloud storage server #3 1010-3, a cloud storage server #4 1010-4, . . . , and a cloud storage server # N+1 1010-(N+1).

Upon detecting that files need to be transmitted from the cloud storage server #1 1010-1 to other cloud storage server, a user device 1020 transmits a file list request message for requesting a file list for files which will be directly transmitted from the cloud storage server #1 1010-1 to the other cloud storage servers at operation 1111. Here, it will be assumed that the number of files is N. Upon receiving the file list request message from the user device 1020, the cloud storage server #1 1010-1 transmits a file list response message including the file list for the N files which will be directly transmitted from the cloud storage server #1 1010-1 to the other cloud storage servers to the user device 1020 at operation 1113.

Upon receiving the file list response message from the cloud storage server #1 1010-1, the user device 1020 determines cloud storage servers to which the N files will be directly transmitted corresponding to a preset file distribution scheme based on the file list included in the file list response message. The file distribution scheme will be described below, so a detailed description will be omitted herein. The user device 1020 generates a shared URL for each of the N files based on the file list at operation 1115.

The user device 1020 transmits a backup request message to each of related cloud storage servers based on the determined result thereby each of the related cloud storage servers may directly download a related file from the cloud storage server #1 1010-1. The cloud storage server #1 1010-1 directly transmits a file to a plurality of cloud storage servers, not one cloud storage server, so the backup request message includes information on a file which will be downloaded to a related cloud storage server.

That is, the user device 1020 transmits a backup request message to each of the cloud storage server #2 1010-2, the cloud storage server #3 1010-3, the cloud storage server #4 1010-4, . . . , and the cloud storage server # N+1 1010-(N+1) at operations 1117, 1121, 1125, and 1129. Upon receiving the backup request message from the user device 1020, each of the cloud storage server #2 1010-2, the cloud storage server #3 1010-3, the cloud storage server #4 1010-4, . . . , and the cloud storage server # N+1 1010-(N+1) directly downloads a related file from the cloud storage server #1 1010-1 at operations 1119, 1123, 1127, and 1131.

A process for transmitting and receiving a signal according to a process for directly transmitting a file to a plurality of cloud storage servers in FIG. 10 has been described with reference to FIG. 11, and a process for directly transmitting a file to a plurality of cloud storage servers based on an equal distribution scheme in a wireless communication system supporting a cloud storage service according to an embodiment of the present disclosure will be described with reference to FIG. 11.

Figure 12:
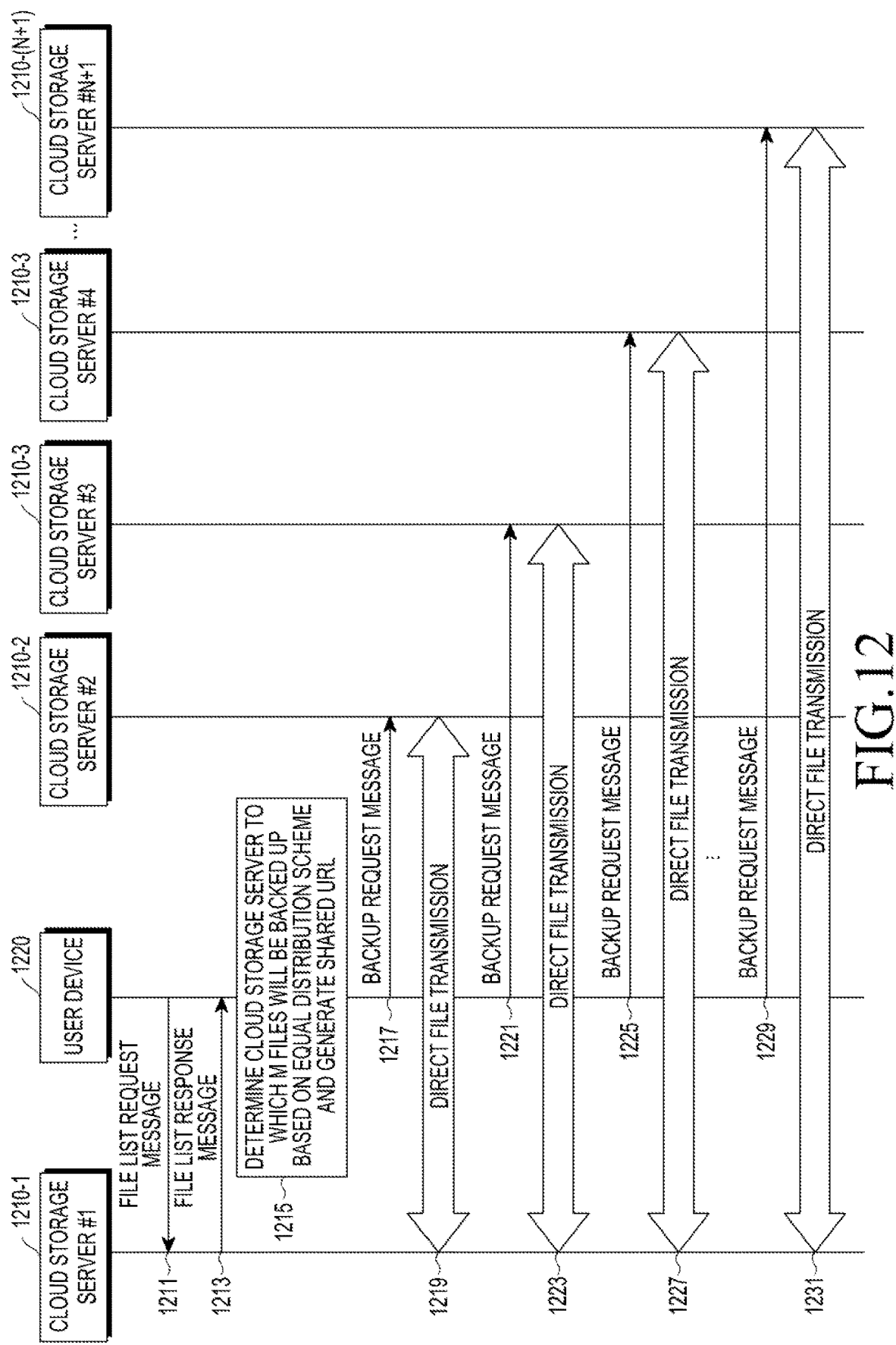
FIG. 12 schematically illustrates a process for directly transmitting a file to a plurality of cloud storage servers based on an equal distribution scheme in a wireless communication system supporting a cloud storage service according to an embodiment of the present disclosure.

FIG. 12 schematically illustrates a process for directly transmitting a file to a plurality of cloud storage servers based on an equal distribution scheme in a wireless communication system supporting a cloud storage service according to an embodiment of the present disclosure.

Referring to FIG. 12, the wireless communication system includes a plurality of cloud storage servers, e.g., N+1 cloud storage servers, e.g., a cloud storage server #1 1210-1, a cloud storage server #2 1210-2, a cloud storage server #3 1210-3, a cloud storage server #4 1210-4, . . . , and a cloud storage server # N+1 1210-(N+1).

Upon detecting that files need to be backed up from the cloud storage server #1 1210-1 to other cloud storage server, a user device 1220 transmits a file list request message for requesting a file list for files which will be transmitted from the cloud storage server #1 1210-1 to the other cloud storage server at operation 1211. Here, it will be assumed that the number of files is M. Upon receiving the file list request message from the user device 1220, the cloud storage server #1 1210-1 transmits a file list response message including the file list for the M files which will be backed up from the cloud storage server #1 1210-1 to the other cloud storage server to the user device 1220 at operation 1213.

Upon receiving the file list response message from the cloud storage server #1 1210-1, the user device 1220 determines cloud storage servers to which the M files will be directly transmitted corresponding to a preset file distribution scheme, i.e., an equal distribution scheme based on the file list included in the file list response message. The equal distribution scheme denotes a scheme in which the files to be directly transmitted are divided by the number of cloud storage servers in which backup is possible thereby a file with the same size is backed up to the cloud storage servers in which the backup is possible.

The user device 1220 generates a shared URL for each of the files which are distributed corresponding to the equal distribution scheme, i.e., the M/N files at operation 1215.

The user device 1220 transmits a backup request message to each of related cloud storage servers based on the determined result thereby each of the related cloud storage servers may directly back up a related file from the cloud storage server #1 1210-1. That is, the user device 1220 transmits a backup request message to each of the cloud storage server #2 1210-2, the cloud storage server #3 1210-3, the cloud storage server #4 1210-4, . . . , and the cloud storage server # N+1 1210-(N+1) at operations 1217, 1221, 1225, and 1229. Upon receiving the backup request message from the user device 1220, each of the cloud storage server #2 1210-2, the cloud storage server #3 1210-3, the cloud storage server #4 1210-4, . . . , and the cloud storage server # N+1 1210-(N+1) directly downloads a related file from the cloud storage server #1 1210-1 at operations 1219, 1223, 1227, and 1231.

A process for directly transmitting a file to a plurality of cloud storage servers based on an equal distribution scheme in a wireless communication system supporting a cloud storage service according to an embodiment of the present disclosure has been described with reference to FIG. 12, and a process for directly transmitting a file to a plurality of cloud storage servers based on a weighted equal distribution scheme in a wireless communication system supporting a cloud storage service according to an embodiment of the present disclosure will be described with reference to FIGS. 13A and 13B.

Figure 13A:
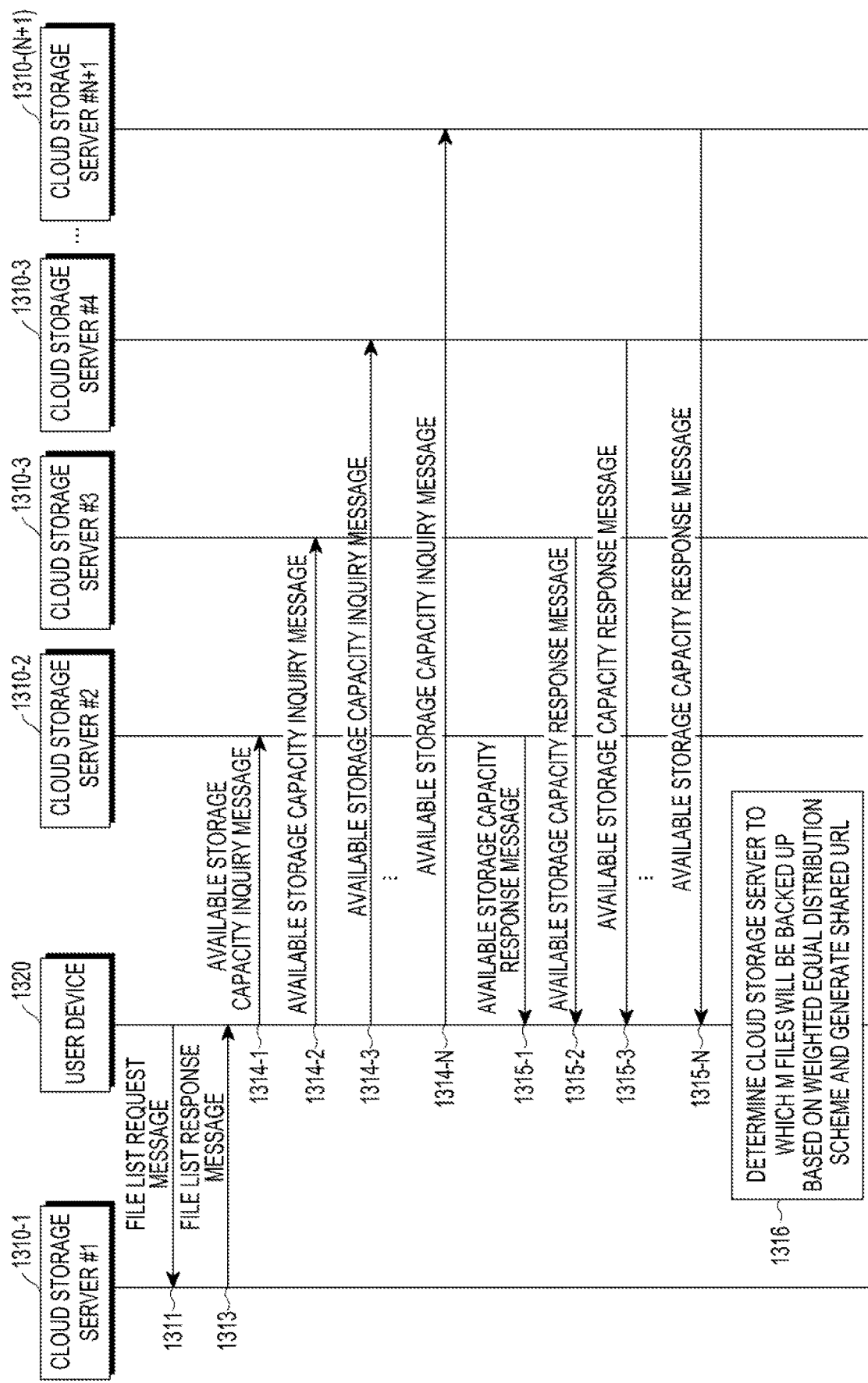
FIGS. 13A and 13B schematically illustrate a process for directly transmitting a file to a plurality of cloud storage servers based on a weighted equal distribution scheme in a wireless communication system supporting a cloud storage service according to an embodiment of the present disclosure.
Figure 13B:
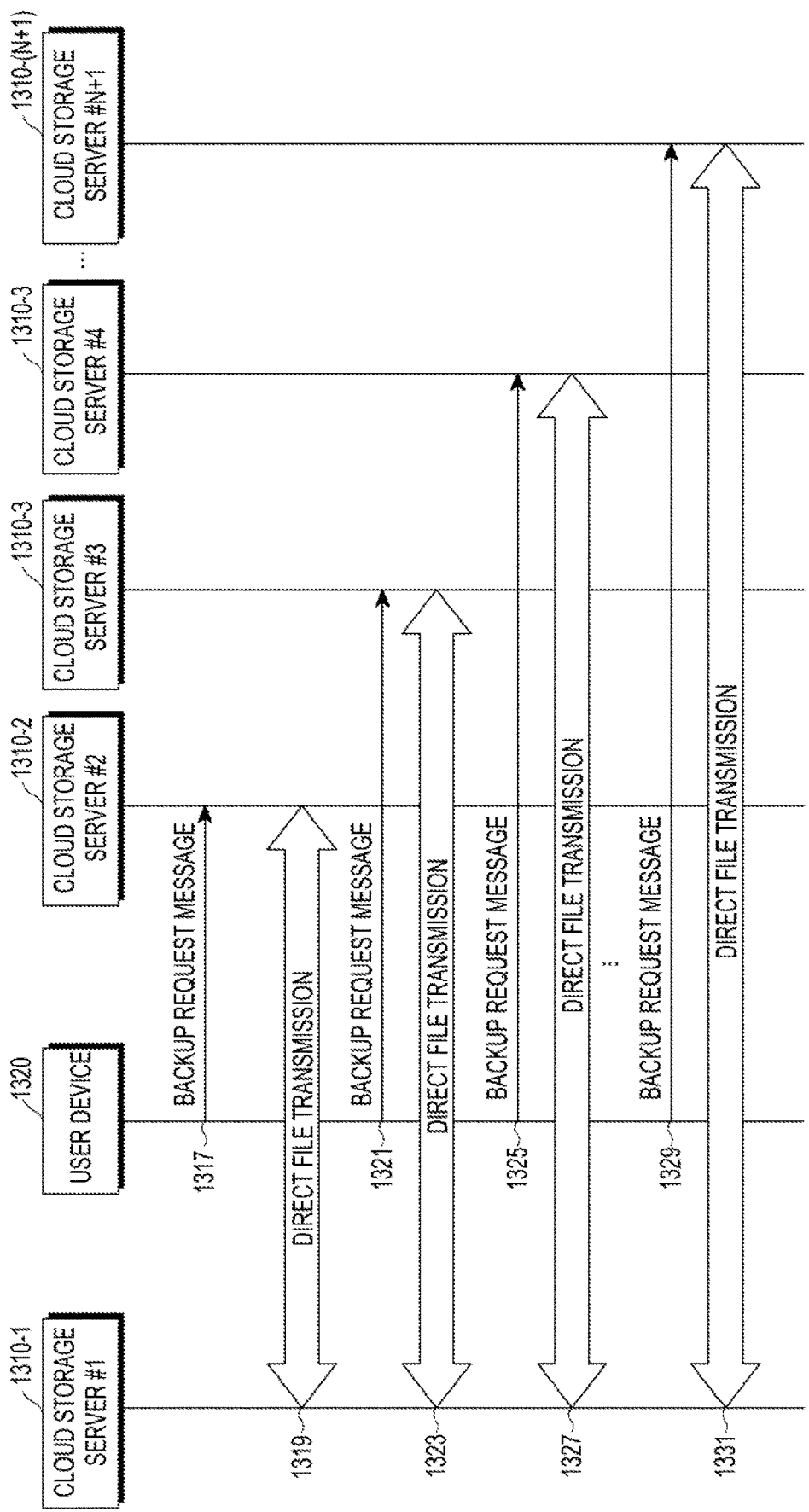

FIGS. 13A and 13B schematically illustrate a process for directly transmitting a file to a plurality of cloud storage servers based on a weighted equal distribution scheme in a wireless communication system supporting a cloud storage service according to an embodiment of the present disclosure.

Referring to FIGS. 13A and 13B, the wireless communication system includes a plurality of cloud storage servers, e.g., N+1 cloud storage servers, e.g., a cloud storage server #1 1310-1, a cloud storage server #2 1310-2, a cloud storage server #3 1310-3, a cloud storage server #4 1310-4, . . . , and a cloud storage server # N+1 1310-(N+1).

Further, operations 1311 and 1313 in FIGS. 13A and 13B are identical to operations 1211 and 1213 in FIG. 12, respectively, and a description thereof will be omitted herein.

Meanwhile, a user device 1320 transmits an available storage capacity inquiry message for inquiring an available storage capacity to each of the cloud storage server #1 1310-1, the cloud storage server #2 1310-2, the cloud storage server #3 1310-3, the cloud storage server #4 1310-4, . . . , and the cloud storage server # N+1 1310-(N+1) at operations 1314-1, 1314-2, 1314-3, . . . , and 1314-N. Upon receiving the available storage capacity inquiry message from the user device 1320, each of the cloud storage server #1 1310-1, the cloud storage server #2 1310-2, the cloud storage server #3 1310-3, the cloud storage server #4 1310-4, . . . , and the cloud storage server # N+1 1310-(N+1) detects an available storage capacity, and transmits an available storage capacity response message including the detected available storage capacity to the user device 1320 at operations 1315-1, 1315-2, 1315-3, . . . , and 1315-N.

Upon receiving the available storage capacity response message from each of the cloud storage server #1 1310-1, the cloud storage server #2 1310-2, the cloud storage server

3 1310-3, the cloud storage server #4 1310-4, ..., and the cloud storage server # N+1 1310-(N+1), the user device 1320 determines cloud storage servers to which M files will be directly backed up corresponding to a preset file distribution scheme, i.e., a weighted equal distribution scheme based on the file list included in the file list response message and the available storage capacity included in each available storage capacity response message. The weighted equal distribution scheme is a scheme in which a file with the same size is backed up to cloud storage servers in which backup is possible by applying an available storage capacity of each of the cloud storage servers in which backup is possible as a weight to the files to be directly backed up.

Here, the number of files which will be received in each cloud storage server in the weighted equal distribution scheme may be expressed as Equation 1.

$$B = M \times \frac{w_k}{\sum_{2}^{N} w_k}$$

Equation 1

In Equation 1, B denotes the number of files which will be received in each cloud storage server, N denotes the number of cloud storage servers in which backup is possible, and $w_k$ denotes an available storage capacity of each cloud storage server.

The user device 1320 generates a shared URL for each of the files which are distributed corresponding to the weighted equal distribution scheme at operation 1316.

The user device 1320 transmits a backup request message to each of related cloud storage servers based on the determined result thereby each of the related cloud storage servers may directly back up a related file from the cloud storage server #1 1310-1.

Further, operations 1317 to 1331 in FIGS. 13A and 13B are identical to operations 1217 to 1231 in FIG. 12, and a description thereof will be omitted herein.

A process for directly transmitting a file to a plurality of cloud storage servers based on a weighted equal distribution scheme in a wireless communication system supporting a cloud storage service according to an embodiment of the present disclosure has been described with reference to FIGS. 13A and 13B, and a process for directly transmitting a file to a plurality of cloud storage servers based on a priority distribution scheme in a wireless communication system supporting a cloud storage service according to an embodiment of the present disclosure will be described with reference to FIGS. 14A and 14B.

Figure 14A:
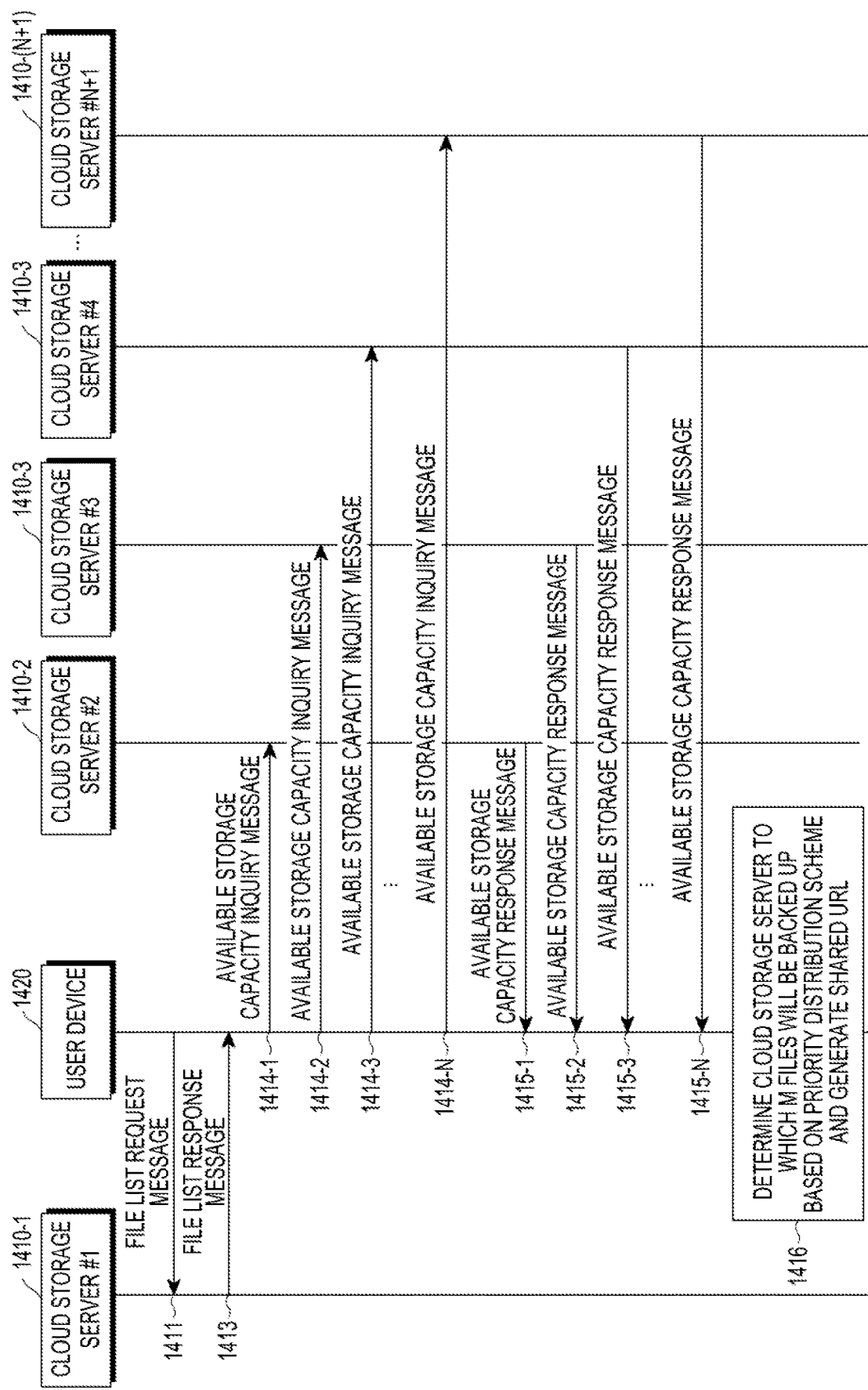
FIGS. 14A and 14B schematically illustrate a process for directly transmitting a file to a plurality of cloud storage servers based on a priority distribution scheme in a wireless communication system supporting a cloud storage service according to an embodiment of the present disclosure.
Figure 14B:
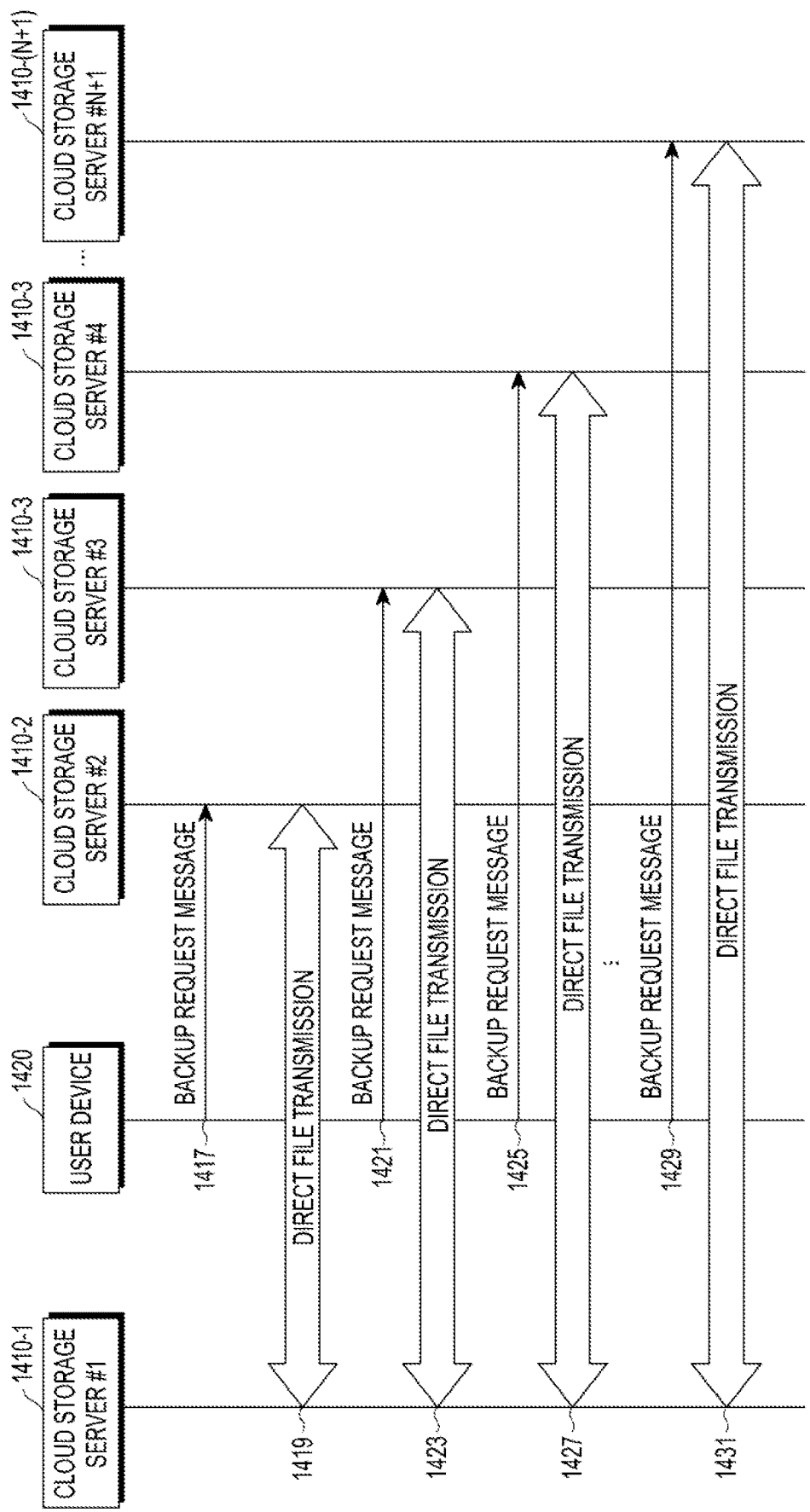

FIGS. 14A and 14B schematically illustrate a process for directly transmitting a file to a plurality of cloud storage servers based on a priority distribution scheme in a wireless communication system supporting a cloud storage service according to an embodiment of the present disclosure.

Referring to FIGS. 14A and 14B, the wireless communication system includes a plurality of cloud storage servers, e.g., N+1 cloud storage servers, e.g., a cloud storage server #1 1410-1, a cloud storage server #2 1410-2, a cloud storage server #3 1410-3, a cloud storage server #4 1410-4, ..., and a cloud storage server # N+1 1410-(N+1).

Further, operations 1411, 1413, 1414-1, 1414-2, 1414-3, ..., 1414-N, 1415-1, 1415-2, 1415-3, ..., and 1415-N in FIGS. 14A and 14B are identical to operations 1311, 1313, 1314-1, 1314-2, 1314-3, ..., 1314-N, 1315-1, 1315-2, 1315-3, ..., and 1315-N in FIGS. 13A and 13B, and a description thereof will be omitted herein.

Upon receiving the available storage capacity response message from each of the cloud storage server #1 1410-1, the cloud storage server #2 1410-2, the cloud storage server #3 1410-3, the cloud storage server #4 1410-4, ..., and the cloud storage server # N+1 1410-(N+1), the user device 1420 determines cloud storage servers to which M files will be directly backed up corresponding to a preset file distribution scheme, i.e., a priority distribution scheme based on the file list included in the file list response message and an available storage capacity included in each available storage capacity response message. The priority distribution scheme is a scheme in which files with a size which corresponds to an available storage capacity of a related cloud storage server are distributed according to priorities of cloud storage servers.

The user device 1420 generates a shared URL for each of the files which are distributed corresponding to the priority distribution scheme at operation 1416.

The user device 1420 transmits a backup request message to each of related cloud storage servers based on the determined result thereby each of the related cloud storage servers may directly back up a related file from the cloud storage server #1 1410-1.

Further, operations 1417 to 1431 in FIGS. 14A and 14B are identical to operations 1217 to 1231 in FIG. 12, and a description thereof will be omitted herein.

A process for directly transmitting a file to a plurality of cloud storage servers based on a priority distribution scheme in a wireless communication system supporting a cloud storage service according to an embodiment of the present disclosure has been described with reference to FIGS. 14A and 14B, and a process for directly transmitting a file to a plurality of cloud storage servers based on a file type distribution scheme in a wireless communication system supporting a cloud storage service according to an embodiment of the present disclosure will be described with reference to FIGS. 15A and 15B.

Figure 15A:
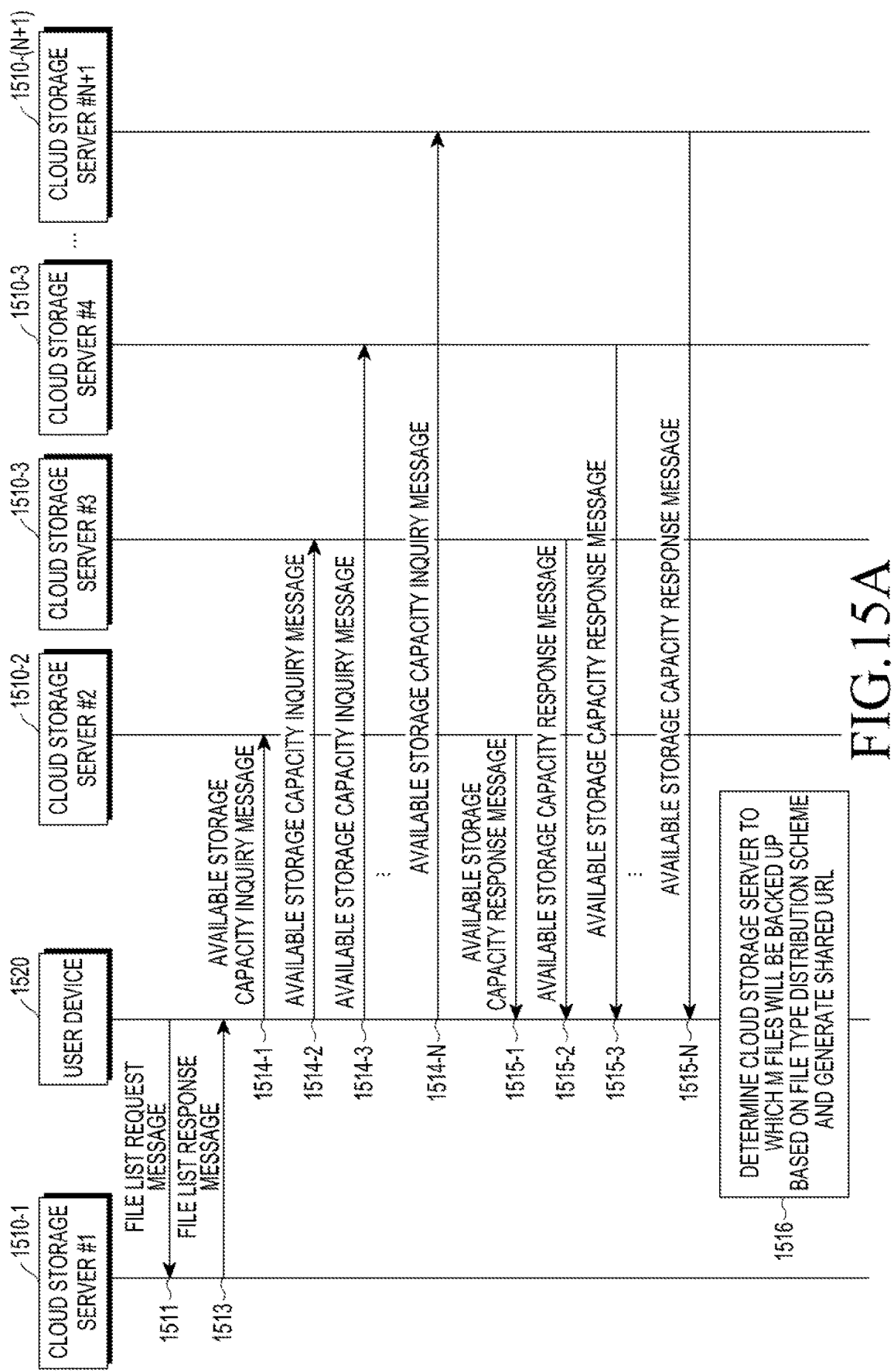
FIGS. 15A and 15B schematically illustrate a process for directly transmitting a file to a plurality of cloud storage servers based on a file type distribution scheme in a wireless communication system supporting a cloud storage service according to an embodiment of the present disclosure.
Figure 15B:
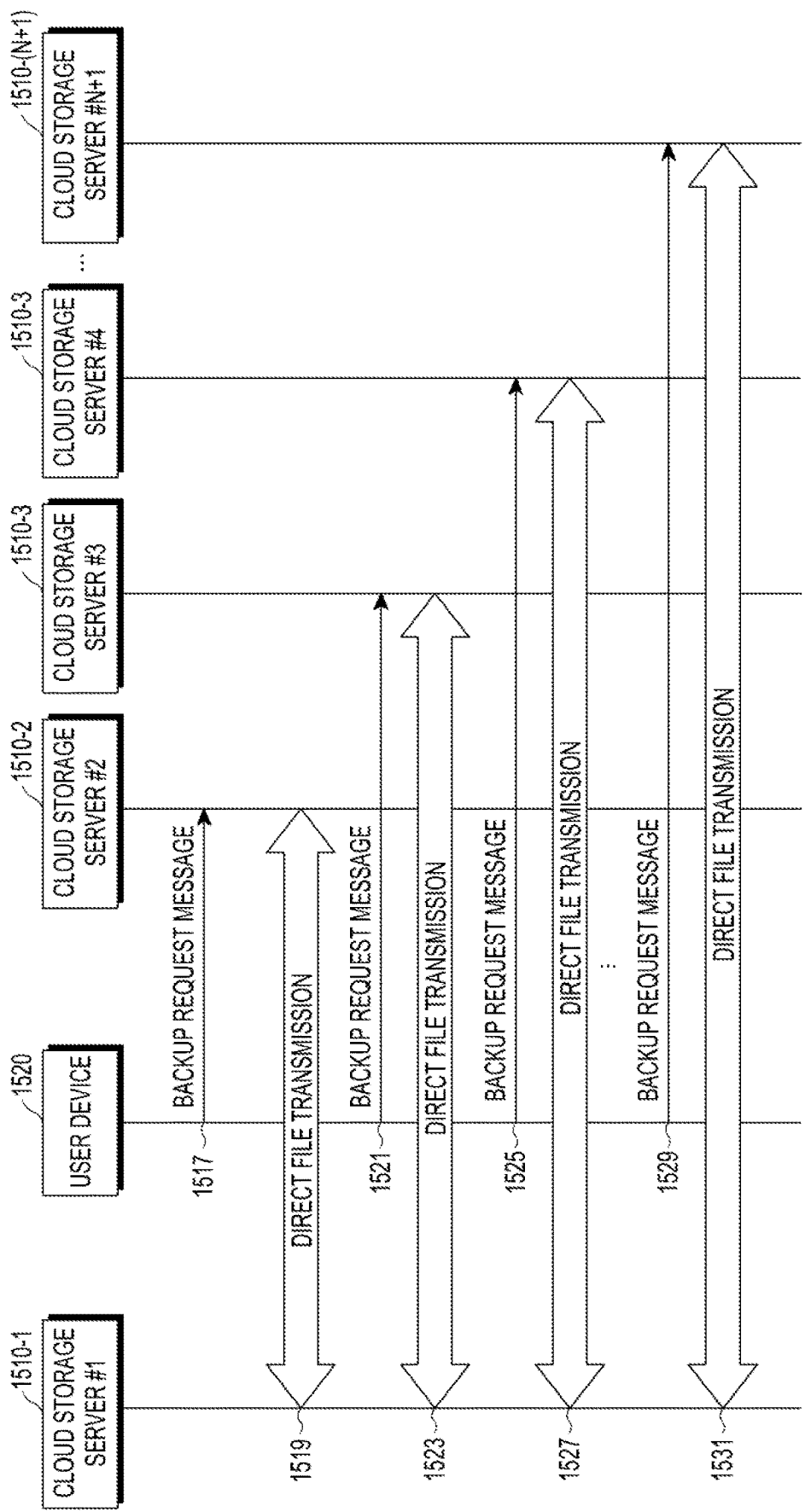

FIGS. 15A and 15B schematically illustrate a process for directly transmitting a file to a plurality of cloud storage servers based on a file type distribution scheme in a wireless communication system supporting a cloud storage service according to an embodiment of the present disclosure.

Referring to FIGS. 15A and 15B, the wireless communication system includes a plurality of cloud storage servers, e.g., N+1 cloud storage servers, e.g., a cloud storage server #1 1510-1, a cloud storage server #2 1510-2, a cloud storage server #3 1510-3, a cloud storage server #4 1510-4, ..., and a cloud storage server # N+1 1510-(N+1).

Further, operations 1511, 1513, 1514-1, 1514-2, 1514-3, ..., 1514-N, 1515-1, 1515-2, 1515-3, ..., and 1515-N in FIGS. 15A and 15B are identical to operations 1311, 1313, 1314-1, 1314-2, 1314-3, ..., 1314-N, 1315-1, 1315-2, 1315-3, ..., and 1315-N in FIGS. 13A and 13B, and a description thereof will be omitted herein.

Upon receiving the available storage capacity response message from each of the cloud storage server #1 1510-1, the cloud storage server #2 1510-2, the cloud storage server #3 1510-3, the cloud storage server #4 1510-4, ..., and the cloud storage server # N+1 1510-(N+1), the user device 1520 determines cloud storage servers to which M files will be directly backed up corresponding to a preset file distribution scheme, i.e., a file type distribution scheme based on the file list included in the file list response message and an available storage capacity included in each available storage capacity response message. The file type distribution scheme is a scheme in which each cloud storage server determines a file which will be backed up corresponding to a preset file type. If a size of a file which needs to be backed up in a related cloud storage server is greater than an available storage capacity of the related cloud storage server, the user device 1520 determines that other cloud storage server needs to back up the file.

The user device 1520 generates a shared URL for each of the files which are distributed corresponding to the priority distribution scheme at operation 1516.

The user device 1520 transmits a backup request message to each of related cloud storage servers based on the determined result thereby each of the related cloud storage servers may directly back up a related file from the cloud storage server #1 1510-1.

Further, operations 1517 to 1531 in FIGS. 15A and 15B are identical to operations 1217 to 1231 in FIG. 12, and a description thereof will be omitted herein.

A process for directly transmitting a file to a plurality of cloud storage servers based on a file type distribution scheme in a wireless communication system supporting a cloud storage service according to an embodiment of the present disclosure has been described with reference to FIGS. 15A and 15B, and a process for directly transmitting a file to a plurality of cloud storage servers based on a user preference distribution scheme in a wireless communication system supporting a cloud storage service according to an embodiment of the present disclosure will be described with reference to FIGS. 16A and 16B.

Figure 16A:
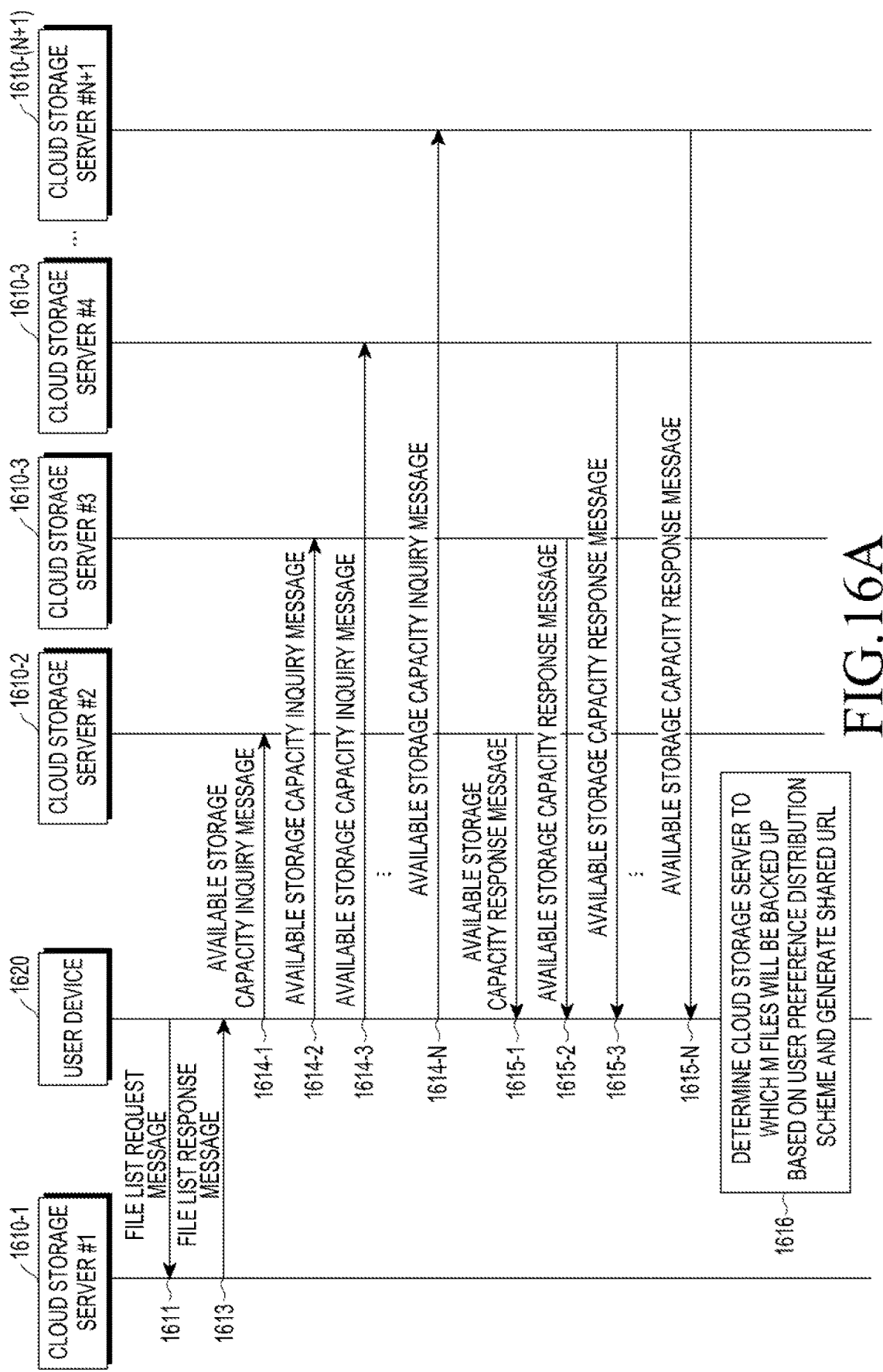
FIGS. 16A and 16B schematically illustrate a process for directly transmitting a file to a plurality of cloud storage servers based on a user preference distribution scheme in a wireless communication system supporting a cloud storage service according to an embodiment of the present disclosure.
Figure 16B:
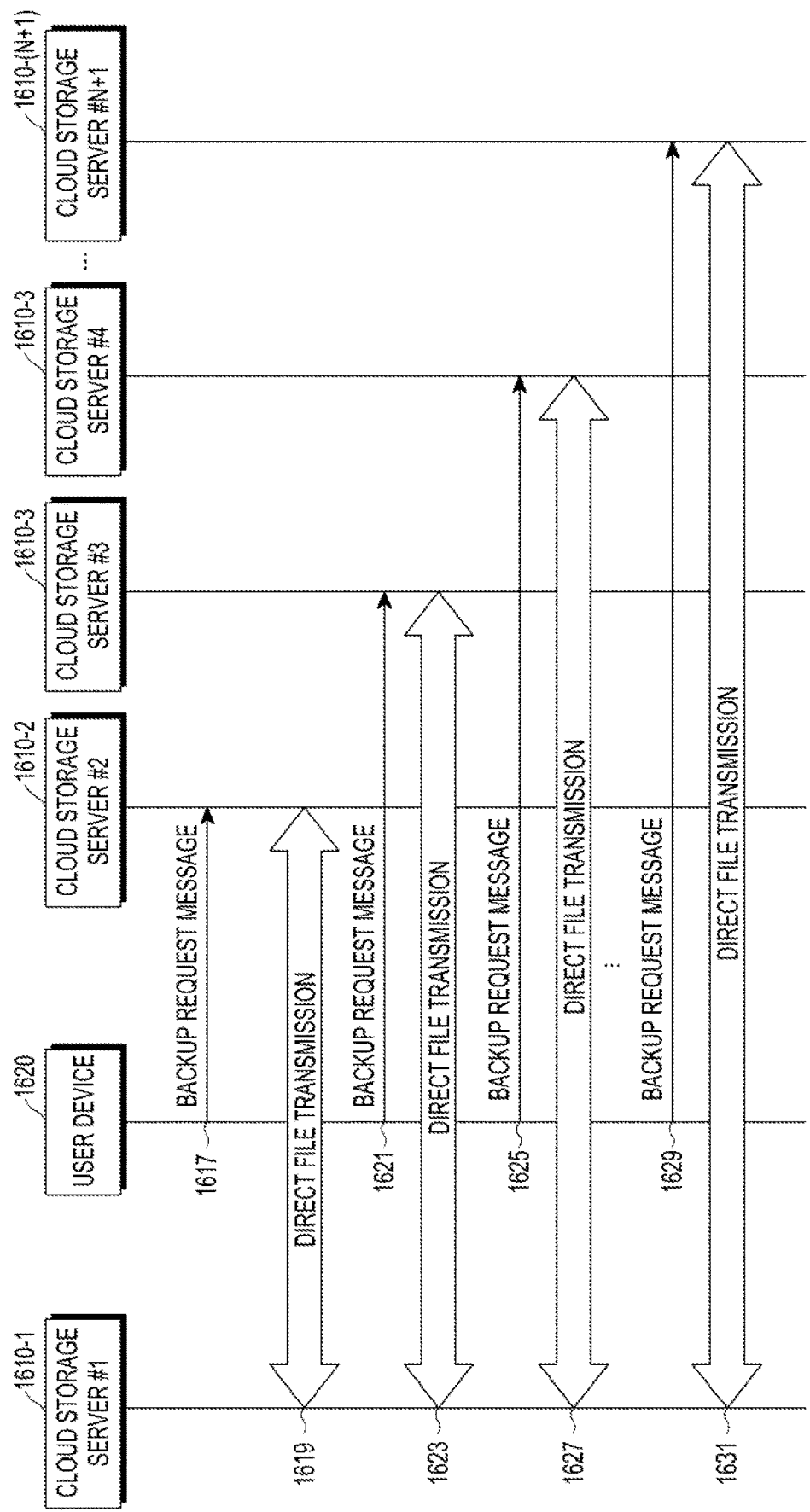

FIGS. 16A and 16B schematically illustrate a process for directly transmitting a file to a plurality of cloud storage servers based on a user preference distribution scheme in a wireless communication system supporting a cloud storage service according to an embodiment of the present disclosure.

Referring to FIGS. 16A and 16B, the wireless communication system includes a plurality of cloud storage servers, e.g., N+1 cloud storage servers, e.g., a cloud storage server #1 1610-1, a cloud storage server #2 1610-2, a cloud storage server #3 1610-3, a cloud storage server #4 1610-4, ..., and a cloud storage server # N+1 1610-(N+1).

Further, operations 1611, 1613, 1614-1, 1614-2, 1614-3, ..., 1614-N, 1615-1, 1615-2, 1615-3, ..., and 1615-N in FIGS. 16A and 16B are identical to operations 1311, 1313, 1314-1, 1314-2, 1314-3, ..., 1314-N, 1315-1, 1315-2, 1315-3, ..., and 1315-N in FIGS. 13A and 13B, and a description thereof will be omitted herein.

Upon receiving the available storage capacity response message from each of the cloud storage server #1 1610-1, the cloud storage server #2 1610-2, the cloud storage server #3 1610-3, the cloud storage server #4 1610-4, ..., and the cloud storage server # N+1 1610-(N+1), the user device 1620 determines cloud storage servers to which M files will be directly backed up corresponding to a preset file distribution scheme, i.e., a user preference distribution scheme based on the file list included in the file list response message and an available storage capacity included in each available storage capacity response message. The user preference distribution scheme is a scheme in which each cloud storage server determines a file which will be backed up based on a preset criterion. For example, the user preference distribution scheme denotes a scheme in which files are distributed corresponding to user preference that it is set that the cloud storage server #2 1610-2 backs up a file with a size which is greater than or equal to 100 MB, and the cloud storage server #3 1610-3 backs up only a text file.

The user device 1620 generates a shared URL for each of the files which are distributed corresponding to the user preference distribution scheme at operation 1616.

The user device 1620 transmits a backup request message to each of related cloud storage servers based on the determined result thereby each of the related cloud storage servers may directly back up a related file from the cloud storage server #1 1610-1.

Further, operations 1617 to 1631 in FIGS. 16A and 16B are identical to operations 1217 to 1231 in FIG. 12, and a description thereof will be omitted herein.

Meanwhile, an embodiment of the present disclosure proposes an automatic backup scheme, and this will be described below.

Firstly, if a user device stores a file at a cloud storage server, the cloud storage server may automatically back up the file to another device related to the user device. This automatic backup scheme is a scheme in which other devices related to a user device may automatically download a file stored at a cloud storage server to use the file. In this case, the other devices may download the file stored at the cloud storage server based on a file distribution scheme described in FIGS. 12, 13A, 13B, 14A, 14B, 15A, 15B, 16A, and 16B. That is, the other devices operate like a cloud storage server #2 to a cloud storage server # N+1 described in FIGS. 12, 13A, 13B, 14A, 14B, 15A, 15B, 16A, and 16B. Here, the other devices may be preset by the user device.

Meanwhile, the user device may make the file stored at the cloud storage server to be automatically backed up based on a characteristic of the other devices.

For example, if the other device is a device with a relatively limited function such as a wearable device, the user device may control a file which may not be used in the wearable device such as a file not to be backed up to the wearable device.

For another example, if the other device is a speaker, the user device may control a file which may not be used in the speaker such as a picture not to be backed up to the speaker, and may control a file which may be used in the speaker such as an audio file to be backed up to the speaker.

For another example, if the other device is a watch type-device, the user device may reduce a size of a file corresponding to a user interface (UI) of the watch type-device thereby the reduced size of file may be backed up.

An example of an inner structure of a user device in a wireless communication system supporting a cloud storage service according to an embodiment of the present disclosure will be described with reference to FIG. 17.

Figure 17:
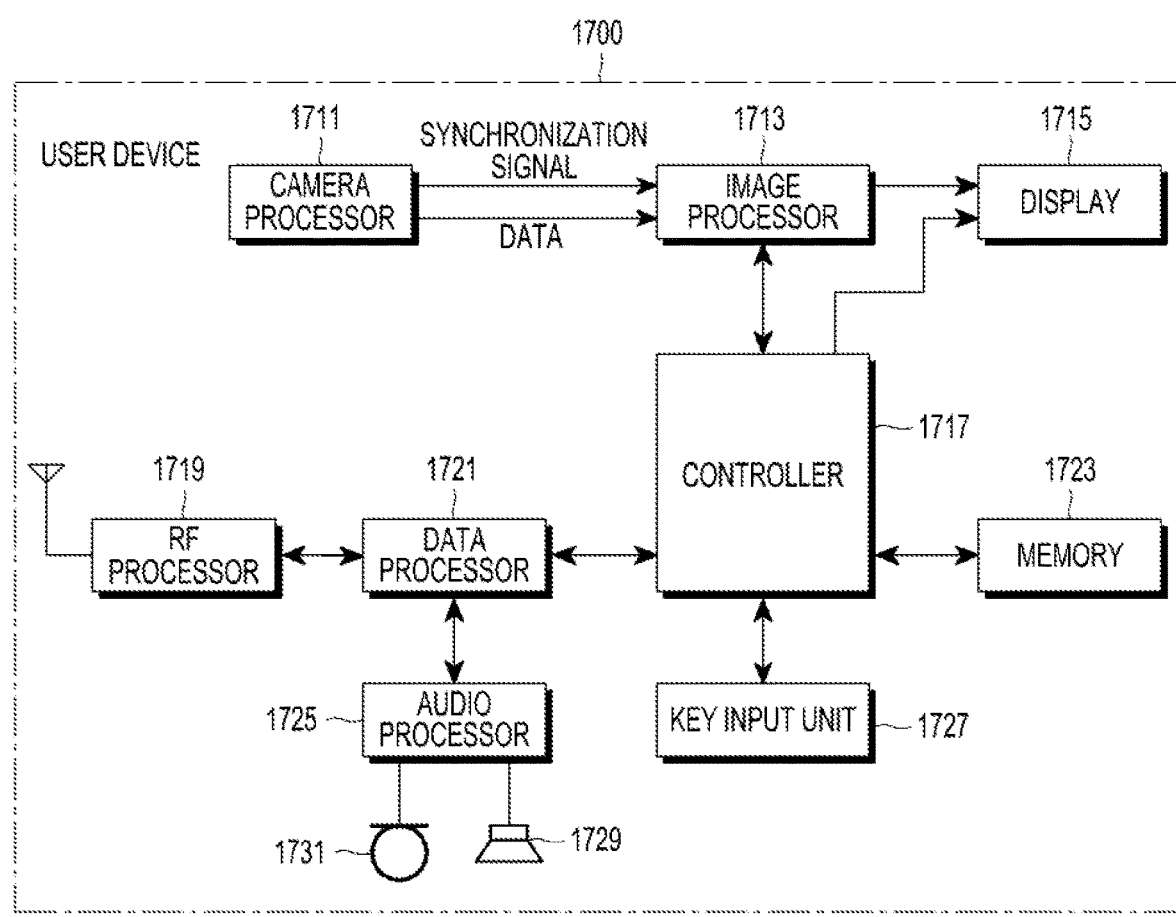
FIG. 17 schematically illustrates an example of an inner structure of a user device in a wireless communication system supporting a cloud storage service according to an embodiment of the present disclosure.

FIG. 17 schematically illustrates an example of an inner structure of a user device in a wireless communication system supporting a cloud storage service according to an embodiment of the present disclosure.

Referring to FIG. 17, a user device 1700 may be connected with an external electronic device (not illustrated in FIG. 17) using at least one of a communication module, a connector, and an earphone connecting jack. The electronic device may include one of various devices which are removable from the user device 1700 and are connectable with the user device 1700 in a wired manner, such as, for example, an earphone, an external speaker, a universal serial bus (USB) memory, a charging device, a cradle/dock, a DMB antenna, a mobile payment-related device, a health management device (a blood pressure monitor or the like), a game console, a vehicle navigation device, and so forth.

The external electronic device may be one of a wirelessly connectable Bluetooth communication device, a near field communication (NFC) device, a WiFi Direct communication device, a wireless access point (AP), etc. The user device 1700 may be connected with a server or another communication device such as, for example, one of a cellular phone, a smart phone, a tablet PC, a desktop PC, and a server, in a wired or wireless manner.

The user device 1700 includes a camera processor 1711, an image processor 1713, a display 1715, a controller 1717, a radio frequency (RF) processor 1719, a data processor 1721, a memory 1723, an audio processor 1725, and a key input unit 1727.

The RF processor 1719 is responsible for radio communication of the user device 1700. The RF processor 1719 includes a RF transmitter for frequency up-converting transmission signals and amplifying the up-converted signals, and a RF receiver for low-noise-amplifying received signals and frequency down-converting the amplified signals.

The data processor 1721 includes a transmitter for encoding and modulating the transmission signals, and a receiver for demodulating and decoding the received signals. In other words, the data processor 1721 may include a modulator/de-modulator (MODEM) and a coder/decoder (CODEC). The CODEC includes a data CODEC for processing packet data, and an audio CODEC for processing audio signals such as voice.

The audio processor 1725 plays received audio signals output from the audio CODEC in the data processor 1721 using a speaker 1729, and transfers transmission audio signals picked up by a microphone 1731 to the audio CODEC in the data processor 1721.

The key input unit 1727 includes numeric/character keys for inputting numeric and character information and function keys for setting various functions.

A memory 1723 may include a program memory, a data memory, and the like. The program memory may store programs for controlling the general operation of the user device 1700. In accordance with an embodiment to the present disclosure, the memory 1723 may store programs related to an operation of directly transmitting a file between cloud storage servers. The data memory may temporarily store the data generated during execution of these programs.

The memory 1723 may be implemented as an arbitrary data storing device such as a read only memory (ROM), a random access memory (RAM), and a memory card (for example, a secure digital (SD) card, and a memory stick). The memory 1723 may include a non-volatile memory, a volatile memory, a hard disk drive (HDD), or a solid state drive (SSD).

The memory 1723 may also store applications of various functions such as navigation, video communication, games, an alarm application based on time, images for providing a graphical user interface (GUI) related to the applications, user information, documents, databases or data related to a method for processing touch inputs, background images (for example, a menu screen, a standby screen, and so forth), operation programs necessary for driving the user device 1700, and images captured by the camera processor 1711.

The memory 1723 is a media which is red though a machine, e.g., a computer. Here, the term "machine-readable medium" includes a medium for providing data to the machine to allow the machine to execute a particular function. The memory 1723 may include non-volatile media and volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a compact disc ROM (CD-ROM), an optical disk, a punch card, a paper tape, a RAM, a programmable ROM (PROM), an erasable programmable ROM (EPROM), and a flash-EPROM.

The controller 1717 controls the overall operation of the user device 1700. The controller 1717 performs an operation related to an operation of directly transmitting a file between cloud storage serves according to an embodiment of the present disclosure. The operation related to the operation of directly transmitting the file between the cloud storage serves according to an embodiment of the present disclosure is performed in the manner described before with reference to FIGS. 2 to 12, 13A, 13B, 14A, 14B, 15A, 15B, 16A, and 16B, so a detailed description thereof will be omitted herein. Although the controller 1717 is illustrated as being one unit, it is noted that the controller 1717 may be embodied in one or more processors without departing from the teachings of the disclosure.

A camera processor 1711 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 1713 performs image signal processing (ISP) for displaying the image signals output from the camera processor 1711 on the display 1715. The ISP may include gamma correction, interpolation, spatial variations, image effects, image scaling, automatic white balance (AWB), automatic exposure (AE), and automatic focus (AF). The image processor 1713 processes the image signals output from the camera processor 1711 on a frame-by-frame basis, and outputs the frame image data according to the characteristics and size of the display 1715.

The image processor 1713 includes a video codec, which compresses the frame image data displayed on the display 1715 by a preset coding scheme, and decompresses the compressed frame image data into the original frame image data. The video codec may include a joint photographic experts group (JPEG) codec, a MPEG4 codec, and a Wavelet codec. The image processor 1713 is assumed to have an on-screen display (OSD) function, and may output OSD data according to the size of the displayed screen, under control of the controller 1717.

The display 1715 displays, on its screen, image signals output from the image processor 1713 and user data output from the controller 1717. The display 1715 may include a liquid crystal display (LCD). In this case, the display 1715 may include an LCD controller, a memory capable of storing image data, and an LCD panel. When implemented in a touch screen manner, the LCD may serve as an input unit. In this case, the same keys as those on the key input unit 1727 may be displayed on the display 1715.

If the display 1715 is implemented as the touch screen, the display 1715 outputs an analog signal, which corresponds to at least one input to a user graphic interface, to the controller 1717.

The display 1715 receives at least one user inputs through a user's body (for example, a finger including a thumb) or the key input unit 1727 (for example, a stylus pen or an electronic pen).

The display 1715 receives continuous motions on one touch (for example, a drag). The display 1715 outputs an analog signal corresponding to the continuous motions to the controller 1717.

In an embodiment of the present disclosure, a touch may also include a non-contact touch (for example, when the user input means is positioned within a distance of, for example, 1 cm) in which the user input means may be detected without a direct contact with the display 1715. The touch may also include a direct contact between the display 1715 and a finger or the key input unit 1727. A distance or interval from the display 1715 within which the user input means may be detected may be changed according to the capability or structure of the user device 1700. In particular, to separately detect a direct touch event based on a contact with the user input means and an indirect touch event (that is, a hovering event), the display 1715 may be configured to output different values for values (for example, an analog voltage value or current value) detected in the direct touch event and the hovering event.

The display 1715 may be implemented as, for example, a resistive type, a capacitive type, an infrared type, an acoustic wave type, or a combination thereof.

The display 1715 may include at least two touch panels capable of sensing a touch, an approach of a finger, or the key input unit 1727 to receive inputs generated by the finger or the key input unit 1727. The at least two touch panels provide different output values to the controller 1717. Thus, the controller 1717 differently recognizes the values input from the at least two touch screen panels to identify whether the input from the display 1715 is the input generated by the finger or by the key input unit 1727.

The controller 1717 converts the analog signal received from the display 1715 into a digital signal and controls the display 1715 using the digital signal. For example, the controller 1717 may control a shortcut icon (not illustrated in FIG. 17) displayed on the display 1715 to be selected or executed in response to a direct touch event or a hovering event.

The controller 1717, by detecting a value (for example, an electric-current value) output through the display 1715, recognizes a hovering interval or distance as well as a user input position and converts the recognized distance into a digital signal (for example, a Z coordinate). The controller 1717 may also, by detecting the value output through the display 1715, detect a pressure applied by the user input means to the display 1715, and convert the detected pressure into a digital signal.

While the camera processor 1711, the image processor 1713, the display 1715, the controller 1717, the RF processor 1719, the data processor 1721, the memory 1723, the audio processor 1725, and the key input unit 1727 are shown in FIG. 17 as separate units, it is to be understood that this is for merely convenience of description. In other words, two or more of the camera processor 1711, the image processor 1713, the display 1715, the controller 1717, the RF processor 1719, the data processor 1721, the memory 1723, the audio processor 1725, and the key input unit 1727 may be incorporated into a single unit.

Alternatively, the communication device 1700 may be implemented with one processor.

An example of an inner structure of a user device in a wireless communication system supporting a cloud storage service according to an embodiment of the present disclosure has been described with reference to FIG. 17, and another example of an inner structure of a user device in a wireless communication system supporting a cloud storage service according to an embodiment of the present disclosure will be described with reference to FIG. 18.

Figure 18:
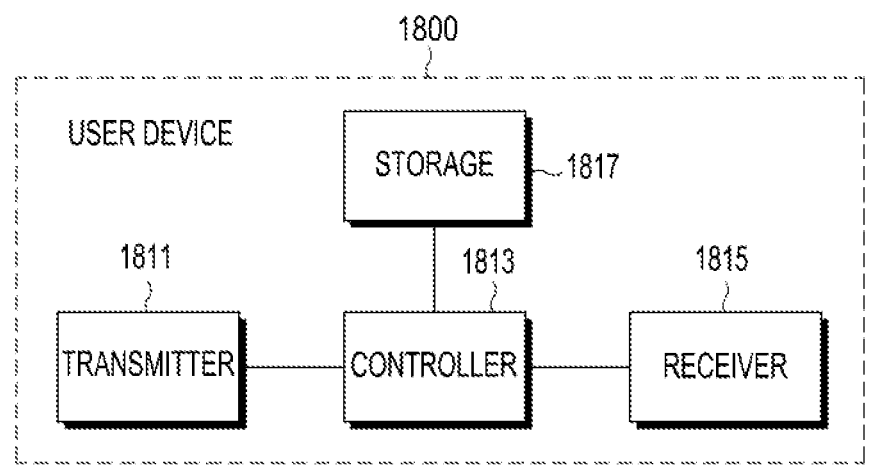
FIG. 18 schematically illustrates another example of an inner structure of a user device in a wireless communication system supporting a cloud storage service according to an embodiment of the present disclosure.

FIG. 18 schematically illustrates another example of an inner structure of a user device in a wireless communication system supporting a cloud storage service according to an embodiment of the present disclosure.

Referring to FIG. 18, a user device 1800 includes a transmitter 1811, a controller 1813, a receiver 1815, and a storage 1817.

The controller 1813 controls the overall operation of the user device 1800. More particularly, the controller 1813 controls the user device 1800 to perform an operation related to an operation of directly transmitting a file between cloud storage servers according to an embodiment of the present disclosure. The operation related to the operation of directly transmitting the file between the cloud storage servers according to an embodiment of the present disclosure is performed in the manner described with reference to FIGS. 2 to 12, 13A, 13B, 14A, 14B, 15A, 15B, 16A, and 16B, and a description thereof will be omitted herein. Although the controller 1813 is illustrated as being one unit, it is noted that the controller 1813 may be embodied in one or more processors without departing from the teachings of the disclosure.

The transmitter 1811 transmits various signals and various messages, and the like to other devices, e.g., a cloud storage server, and the like included in the wireless communication system under a control of the controller 1813. The various signals, the various messages, and the like transmitted in the transmitter 1811 have been described in FIGS. 2 to 12, 13A, 13B, 14A, 14B, 15A, 15B, 16A, and 16B and a description thereof will be omitted herein.

The receiver 1815 receives various signals, various messages, and the like from other devices included in the wireless communication system under a control of the controller 1813. The various signals, the various messages, and the like received in the receiver 1813 have been described in FIGS. 2 to 12, 13A, 13B, 14A, 14B, 15A, 15B, 16A, and 16B and a description thereof will be omitted herein.

The storage 1817 stores a program related to an operation of operation of directly transmitting a file between cloud storage servers according to an embodiment of the present disclosure which the user device 1800 performs under a control of the controller 1813, various data, and the like.

The storage 1817 stores the various signals and the various messages which the receiver 1815 receives from the other devices, and the like.

While the transmitter 1811, the controller 1813, the receiver 1815, and the storage 1817 are described in the user device 1800 as separate units, it is to be understood that this is merely for convenience of description. In other words, two or more of the transmitter 1811, the controller 1813, the receiver 1815, and the storage 1817 may be incorporated into a single unit.

The user device 1800 may be implemented with one processor.

Another example of an inner structure of a user device in a wireless communication system supporting a cloud storage service according to an embodiment of the present disclosure has been described with reference to FIG. 18, and an example of an inner structure of a cloud storage server in a wireless communication system supporting a cloud storage service according to an embodiment of the present disclosure will be described with reference to FIG. 19.

Figure 19:
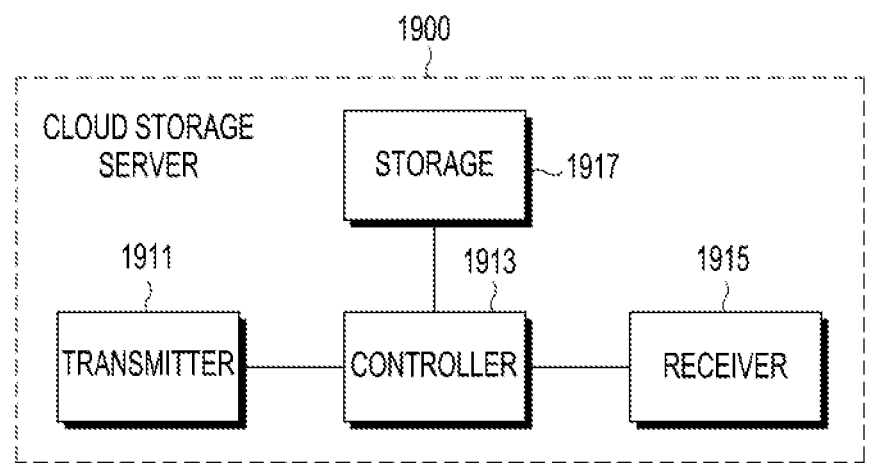
FIG. 19 schematically illustrates an example of an inner structure of a cloud storage server in a wireless communication system supporting a cloud storage service according to an embodiment of the present disclosure.

FIG. 19 schematically illustrates an example of an inner structure of a cloud storage server in a wireless communication system supporting a cloud storage service according to an embodiment of the present disclosure.

Referring to FIG. 19, a cloud storage server 1900 includes a transmitter 1911, a controller 1913, a receiver 1915, and a storage 1917.

The controller 1913 controls the overall operation of the cloud storage server 1900. More particularly, the controller 1913 controls the cloud storage server 1900 to perform an operation related to an operation of directly transmitting a file between cloud storage servers according to an embodiment of the present disclosure. The operation related to the operation of directly transmitting the file between the cloud storage servers according to an embodiment of the present disclosure is performed in the manner described with reference to FIGS. 2 to 12, 13A, 13B, 14A, 14B, 15A, 15B, 16A, and 16B, and a description thereof will be omitted herein. Although the controller 1913 is illustrated as being one unit, it is noted that the controller 1913 may be embodied in one or more processors without departing from the teachings of the disclosure.

The transmitter 1911 transmits various signals and various messages, and the like to other devices, e.g., a user device, and the like included in the wireless communication system under a control of the controller 1913. The various signals, the various messages, and the like transmitted in the transmitter 1911 have been described in FIGS. 2 to 12, 13A, 13B, 14A, 14B, 15A, 15B, 16A, and 16B and a description thereof will be omitted herein.

The receiver 1915 receives various signals, various messages, and the like from other devices included in the wireless communication system under a control of the controller 1913. The various signals, the various messages, and the like received in the receiver 1913 have been described in FIGS. 2 to 12, 13A, 13B, 14A, 14B, 15A, 15B, 16A, and 16B and a description thereof will be omitted herein.

The storage 1917 stores a program related to an operation of operation of directly transmitting a file between cloud storage servers according to an embodiment of the present disclosure which the cloud storage server 1900 performs under a control of the controller 1913, various data, and the like.

The storage 1917 stores the various signals and the various messages which the receiver 1915 receives from the other devices, and the like.

While the transmitter 1911, the controller 1913, the receiver 1915, and the storage 1917 are described in the cloud storage server 1900 as separate units, it is to be understood that this is merely for convenience of description. In other words, two or more of the transmitter 1911, the controller 1913, the receiver 1915, and the storage 1917 may be incorporated into a single unit.

The cloud storage server 1900 may be implemented with one processor.

In accordance with various embodiments of the present disclosure, a method of a cloud storage server in a wireless communication system supporting a cloud storage service is provided. The method comprises providing information or a shared address for at least one file which needs to be backed up to a user device; and directly transmitting the at least one file to at least one other cloud storage server to which the at least one file will be backed up.

In an aspect, the providing of the shared address for the at least one file which needs to be backed up to the user device comprises receiving a shared address request message for requesting the shared address for the at least one file from the user device, and transmitting a shared address response message comprising the shared address for the at least one file to the user device.

In another aspect, the providing of the information for the at least one file which needs to be backed up to the user device comprises receiving a file list request message for requesting a list for files which the cloud storage server will back up from the user device, and transmitting a file list response message comprising the list for the files which the cloud storage server will back up to the user device.

In yet another aspect, if the number of the at least one file is M, and the number of the at least one other cloud storage server is N, the at least one other cloud storage server to which the at least one file will be backed up is determined by one of thereby M/N files will be backed up to each of N other cloud storage servers, based on an available storage capacity of each of N other cloud storage servers thereby M files will be backed up to the N other cloud storage servers, based on an available storage capacity of each of N other cloud storage servers and a priority of each of the N other cloud storage servers thereby M files will be backed up to the N other cloud storage servers, based on an available storage capacity of each of N other cloud storage servers and a file type thereby M files will be backed up to the N other cloud storage servers, or based on an available storage capacity of each of N other cloud storage servers and a preset preference criterion thereby M files will be backed up to the N other cloud storage servers.

In yet another aspect, the shared address is a shared URL.

In accordance with various embodiments of the present disclosure, a method of a cloud storage server in a wireless communication system supporting a cloud storage service is provided. The method includes acquiring a shared address of other cloud storage server to which at least one file will be backed up from a user device; and backing up the at least one file from the other cloud storage server using the shared address.

In an aspect, the acquiring of the shared address of the other cloud storage server to which the at least one file will be backed up from the user device comprises receiving a backup request message comprising the shared address of the other cloud storage server and information on the at least one file from the user device.

In another aspect, the method further comprises receiving a file state check request message for requesting to check a transmission state for the at least one file from the user device, and transmitting a file state check response message comprising transmission state information indicating a transmission state for the at least one file to the user device.

In yet another aspect, the shared address is a shared URL.

As is apparent from the foregoing description, an embodiment of the present disclosure enables to transmit and receive a file in a wireless communication system supporting a cloud storage service.

An embodiment of the present disclosure enables to directly transmit and receive a file between cloud storage servers in a wireless communication system supporting a cloud storage service.

An embodiment of the present disclosure enables to directly transmit and receive a file between cloud storage servers thereby a user device may check a file transmission state in a wireless communication system supporting a cloud storage service.

An embodiment of the present disclosure enables to directly transmit and receive a file between cloud storage servers thereby decreasing power consumption of a user device in a wireless communication system supporting a cloud storage service.

An embodiment of the present disclosure enables to directly transmit and receive a file between cloud storage servers thereby decreasing memory capacity consumption of a user device in a wireless communication system supporting a cloud storage service.

An embodiment of the present disclosure enables to directly transmit and receive a file between cloud storage servers thereby decreasing network resource consumption in a wireless communication system supporting a cloud storage service.

An embodiment of the present disclosure enables to directly transmit and receive a file between cloud storage servers based on a file capacity in a wireless communication system supporting a cloud storage service.

An embodiment of the present disclosure enables to directly transmit and receive a file between cloud storage servers based on an available storage capacity of a cloud storage server in a wireless communication system supporting a cloud storage service.

An embodiment of the present disclosure enables to directly transmit and receive a file between cloud storage servers based on a priority of a cloud storage server in a wireless communication system supporting a cloud storage service.

An embodiment of the present disclosure enables to directly transmit and receive a file between cloud storage servers based on a file type in a wireless communication system supporting a cloud storage service.

An embodiment of the present disclosure enables to directly transmit and receive a file between cloud storage servers based on user preference in a wireless communication system supporting a cloud storage service.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include ROM, RAM, CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device in a wireless communication system supporting a cloud storage service, the device comprising:
a transmitter;
a receiver; and
at least one processor configured to:
when the device is authenticated with a cloud storage server and at least one other cloud storage server, determine whether at least one file in the cloud storage server needs to be backed up,
when the at least one file that is stored in a cloud storage server needs to be backed up, acquire a shared address for the at least one file in the cloud storage server,
determine at least one other cloud storage server to which the at least one file will be backed up,
control the transmitter to transmit a backup request message comprising the shared address to the at least one other cloud storage server,
identify a transmission prediction time for the at least one file, wherein the transmission prediction time for the at least one file is identified based on a number of one or more files for which transmission is standby before the at least one file is transmitted and a transmission time of the backup request message,
control the transmitter to transmit, after the transmission prediction time is elapsed, a file state check request message for identifying a transmission status of the at least one file to the at least one other cloud storage server, and
identify the transmission status of the at least one file based on a response message, with respect to the file state check request message, transmitted from the at least one other cloud storage server.

2. The device of claim 1, wherein, the at least one processor is further configured to:
control the transmitter to transmit a shared address request message for requesting the shared address for the at least one file to the cloud storage server; and control the receiver to receive a shared address response message comprising the shared address for the at least one file from the cloud storage server.

3. The device of claim 1, wherein, the at least one processor is further configured to generate the shared address for the at least one file.

4. The device of claim 1, wherein, when the at least one file is M files, and the at least one other cloud storage server is N other cloud storage servers, the at least one processor is further configured to one of:
- determine whether M/N files will be backed up to each of the N other cloud storage servers,
- determine whether the M files will be backed up to the N other cloud storage servers based on an available storage capacity of each of the N other cloud storage servers,
- determine whether the M files will be backed up to the N other cloud storage servers based on an available storage capacity of each of the N other cloud storage servers and a priority of each of the N other cloud storage servers,
- determine whether the M files will be backed up to the N other cloud storage servers based on an available storage capacity of each of the N other cloud storage servers and a file type, or
- determine whether the M files will be backed up to the N other cloud storage servers based on an available storage capacity of each of the N other cloud storage servers and a preset preference criterion.

5. The device of claim 1, wherein the shared address comprises a shared uniform resource locator (URL).

6. The device of claim 1, wherein the at least one processor is further configured to:
- receive a file list response message from the cloud storage server, the file list response message identifying the at least one file, and
- transmit a message to the cloud storage server to acquire the shared address.

7. A method of a device in a wireless communication system supporting a cloud storage service, the method comprising:
- in response to determining that at least one file that is stored in a cloud storage server needs to be backed up, acquiring a shared address for the at least one file in the cloud storage server;
- determining at least one other cloud storage server to which the at least one file will be backed up;
- transmitting a backup request message comprising the shared address to the at least one other cloud storage server;
- identifying a transmission prediction time for the at least one file, wherein the transmission prediction time for the at least one file is identified based on a number of one or more files for which transmission is standby before the at least one file is transmitted and a transmission time of the backup request message;
- transmitting, after the transmission prediction time is elapsed, a file state check request message for identifying a transmission status of the at least one file to the at least one other cloud storage server; and
- identifying the transmission status of the at least one file based on a response message, with respect to the file state check request message, transmitted from the at least one other cloud storage server.

8. The method of claim 7, wherein the acquiring of the shared address for the at least one file comprises:
- transmitting a shared address request message for requesting the shared address for the at least one file to the cloud storage server; and
- receiving a shared address response message comprising the shared address for the at least one file from the cloud storage server.

9. The method of claim 7, wherein the acquiring of the shared address for the at least one file comprises generating the shared address for the at least one file.

10. The method of claim 7, wherein, if the number of the at least one file is M, and the number of the at least one other cloud storage server is N, the method further comprises one of:
- determining the at least one other cloud storage server thereby M/N files will be backed up to each of N other cloud storage servers,
- determining the at least one other cloud storage server based on an available storage capacity of each of N other cloud storage servers thereby M files will be backed up to the N other cloud storage servers,
- determining the at least one other cloud storage server based on an available storage capacity of each of N other cloud storage servers and a priority of each of the N other cloud storage servers thereby M files will be backed up to the N other cloud storage servers,
- determining the at least one other cloud storage server based on an available storage capacity of each of N other cloud storage servers and a file type thereby M files will be backed up to the N other cloud storage servers, or
- determining the at least one other cloud storage server based on an available storage capacity of each of N other cloud storage servers and a preset preference criterion thereby M files will be backed up to the N other cloud storage servers.

11. The method of claim 7, further comprising:
- receiving a file list response message from the cloud storage server, the file list response message identifying the at least one file; and
- transmitting a message to the cloud storage server to acquire the shared address.

* * * * *